(12) United States Patent
Yamazaki et al.

(10) Patent No.: US 9,591,671 B2
(45) Date of Patent: Mar. 7, 2017

(54) MOBILE COMMUNICATION SYSTEM

(71) Applicant: KYOCERA CORPORATION, Kyoto (JP)

(72) Inventors: Chiharu Yamazaki, Ota-ku (JP); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 22 days.

(21) Appl. No.: 14/431,693

(22) PCT Filed: Sep. 11, 2013

(86) PCT No.: PCT/JP2013/074515
§ 371 (c)(1),
(2) Date: Mar. 26, 2015

(87) PCT Pub. No.: WO2014/050556
PCT Pub. Date: Apr. 3, 2014

(65) Prior Publication Data
US 2015/0257184 A1    Sep. 10, 2015

Related U.S. Application Data

(60) Provisional application No. 61/705,871, filed on Sep. 26, 2012, provisional application No. 61/705,895, (Continued)

(51) Int. Cl.
*H04W 74/08* (2009.01)
*H04W 76/02* (2009.01)
(Continued)

(52) U.S. Cl.
CPC ....... *H04W 74/0833* (2013.01); *H04L 5/0044* (2013.01); *H04L 5/0048* (2013.01);
(Continued)

(58) Field of Classification Search
CPC ... H04W 72/02; H04W 72/04; H04W 76/023; H04W 76/021; H04W 74/0833;
(Continued)

(56) References Cited

U.S. PATENT DOCUMENTS 8,548,483 B2 * 10/2013 Phan ................ H04W 72/048
455/450
8,705,438 B2    4/2014 Laroia et al.
(Continued)

FOREIGN PATENT DOCUMENTS

JP    2008-270889 A    11/2008
JP    2010-533443 A    10/2010

OTHER PUBLICATIONS

Folder etc. "Design Aspects of Network Assisted Device-to-Device Communications", IEEE Communications Magazine, Mar. 2012, published on Mar. 5, 2012.*
(Continued)

*Primary Examiner* — Jianye Wu
(74) *Attorney, Agent, or Firm* — Studebaker & Brackett PC

(57) ABSTRACT

A mobile communication system supports cellular communication in which data communication is performed between a network and a user terminal and D2D communication in which data communication is directly performed among two or more user terminals. The D2D communication is performed by using a part of the uplink radio resources of the cellular communication. The uplink radio resources include a specific radio resource that is used in the transmission of a predetermined uplink signal in the cellular communication. The use of the specific radio resource in the D2D communication is regulated.

6 Claims, 18 Drawing Sheets

Related U.S. Application Data filed on Sep. 26, 2012, provisional application No. 61/706,349, filed on Sep. 27, 2012.

(51) Int. Cl.
*H04W 72/04* (2009.01)
*H04L 5/00* (2006.01)
*H04W 8/00* (2009.01)
*H04W 72/02* (2009.01)

(52) U.S. Cl.
CPC ........... *H04W 8/005* (2013.01); *H04W 72/04* (2013.01); *H04W 76/021* (2013.01); *H04W 76/023* (2013.01); *H04L 5/0053* (2013.01); *H04L 5/0057* (2013.01); *H04L 5/0073* (2013.01); *H04W 72/02* (2013.01)

(58) Field of Classification Search
CPC .... H04W 8/005; H04L 5/0044; H04L 5/0057; H04L 5/0073; H04L 5/0053
See application file for complete search history.

(56) References Cited

U.S. PATENT DOCUMENTS

| | | |
|---|---|---|
| 2009/0016261 A1 | 1/2009 | Laroia et al. |
| 2011/0255450 A1 | 10/2011 | Wang et al. |
| 2012/0083283 A1* | 4/2012 | Phan ................... H04W 72/048 455/450 |
| 2012/0275355 A1* | 11/2012 | Park ..................... H04L 1/1893 370/281 |
| 2013/0155962 A1 | 6/2013 | Hakola et al. |
| 2013/0242932 A1* | 9/2013 | Tiirola .................. H04W 16/14 370/329 |
| 2013/0336299 A1* | 12/2013 | Lee ....................... H04L 5/0007 370/336 |
| 2014/0126530 A1 | 5/2014 | Siomina et al. |
| 2015/0055579 A1 | 2/2015 | Wu et al. |
| 2015/0180616 A1* | 6/2015 | Lee ....................... H04L 1/1812 370/329 |
| 2015/0189638 A1* | 7/2015 | Lin ....................... H04W 16/02 370/330 |

OTHER PUBLICATIONS

International Search Report; PCT/JP2013/074515; Oct. 15, 2013.
3GPP TR 22.803 V0.3.0 (May 2012); 3rd Generation Partnership Project; Technical Specification Group SA; Feasibility Study for Proximity Services (ProSe) (Release 12); pp. 1-24.
L.Lei et al.; "Operator Controlled Device-to-Device Communications in LTE-Advanced Networks"; Wireless Communications, IEEE; vol. 19, Issue 3, Jun. 2012.
Office Action dated Aug. 12, 2016 from corresponding U.S. Appl. No. 15/167,198, 16 pp.

* cited by examiner

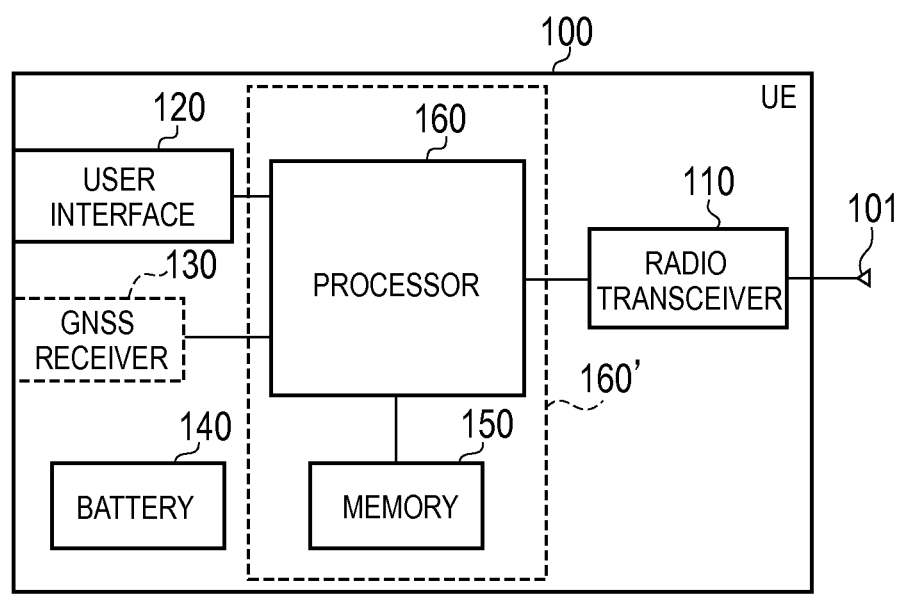
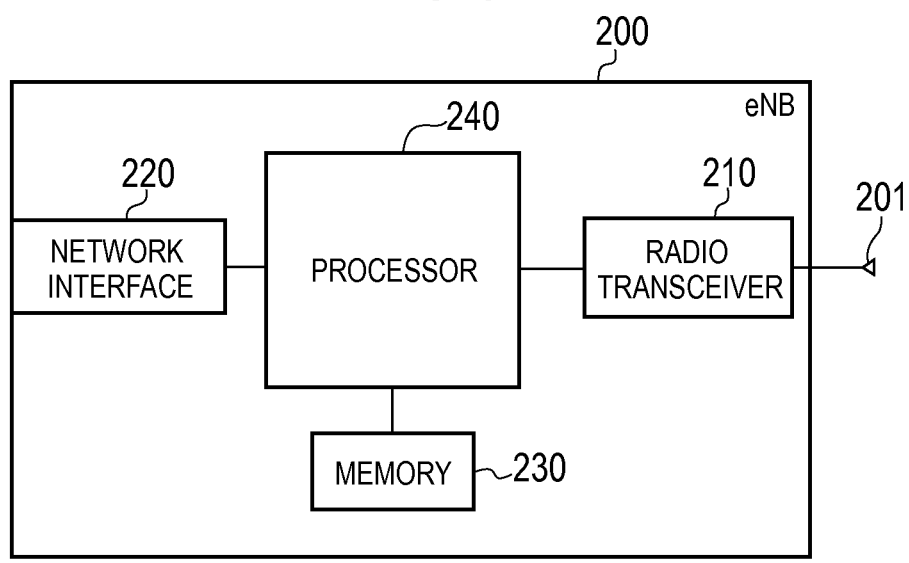

FIG. 9

| PUCCH | PUCCH | PUCCH | PUCCH | PUCCH | PUCCH | PUCCH | PUCCH | PUCCH | PUCCH |
|---|---|---|---|---|---|---|---|---|---|
| | PUSCH | PUSCH | PUSCH | PUSCH | PUSCH | PUSCH | PUSCH | PUSCH | |
| PUSCH | D2D/Tx | D2D/Rx | | | | | | | |
| | PUSCH | PUSCH | | | | | | | |
| PUCCH | PUCCH | PUCCH | PUCCH | PUCCH | PUCCH | PUCCH | PUCCH | PUCCH | PUCCH |

FIG. 22
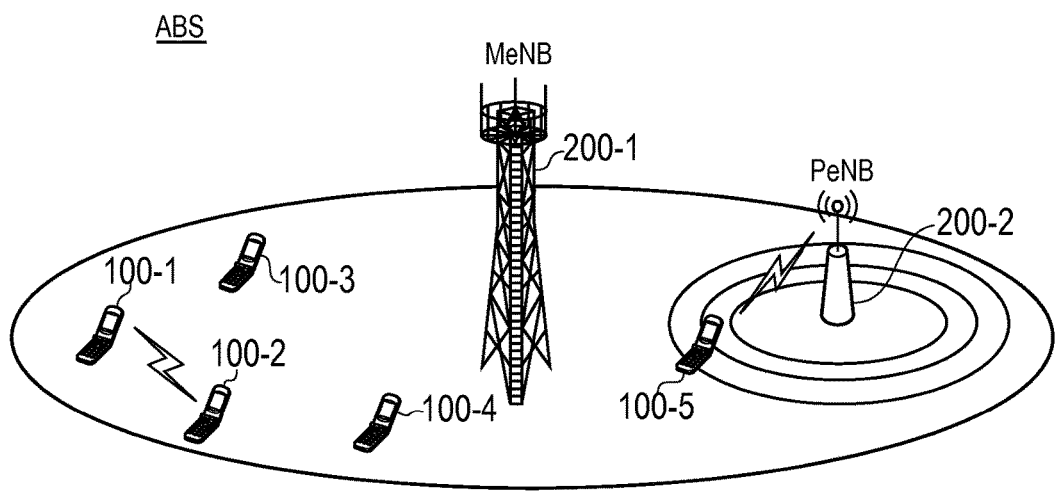
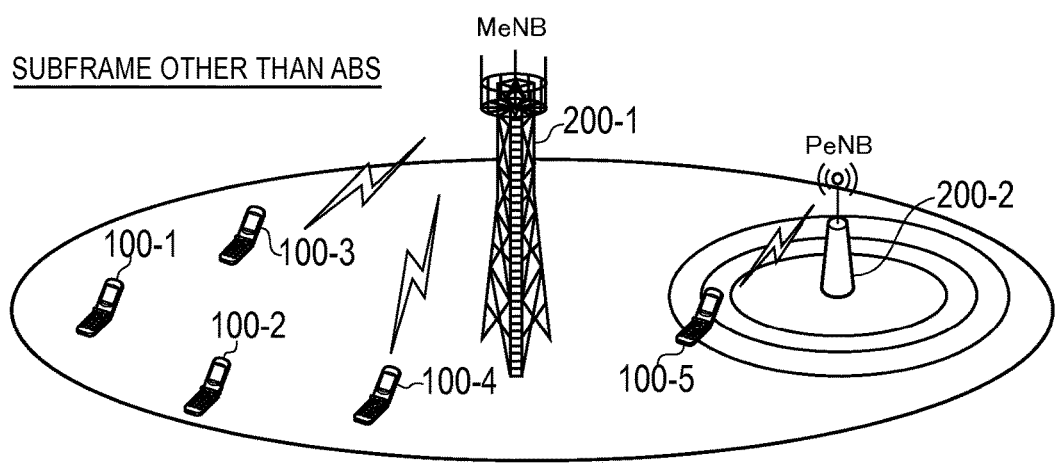

MOBILE COMMUNICATION SYSTEM

CROSS REFERENCE

The entire contents of U.S. Provisional Application No. 61/705,871 (filed on Sep. 26, 2012), U.S. Provisional Application No. 61/705,895 (filed on Sep. 26, 2012), and U.S. Provisional Application No. 61/706,349 (filed on Sep. 27, 2012) are incorporated herein by reference.

TECHNICAL FIELD

The present disclosure relates to a mobile communication system that supports D2D communication.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1).

In the D2D communication, a plurality of user terminals adjacent to one another perform direct communication in a frequency band assigned to a mobile communication system. It is noted that the D2D communication is also called Proximity Service communication.

PRIOR ART DOCUMENTS

Non Patent Document

[Non Patent Document 1] 3GPP technical report "TR 22.803 V0.3.0" May 2012

SUMMARY OF THE DISCLOSURE

However, at present, since there are no specifications formulated for appropriately controlling the D2D communication, it is difficult for the D2D communication to coexist with cellular communication (communication between a network and a user terminal).

Therefore, the present disclosure provides a mobile communication system capable of appropriately controlling D2D communication.

In one embodiment, a mobile communication system supports: cellular communication in which data communication is performed between a network and a user terminal; and D2D communication in which data communication is directly performed among two or more user terminals. The D2D communication is performed by using a part of the uplink radio resources of the cellular communication. The uplink radio resources include a specific radio resource that is used in the transmission of a predetermined uplink signal in the cellular communication. The use of the specific radio resource in the D2D communication is regulated.

In one embodiment, a mobile communication system supports: cellular communication in which data communication is performed between a network and a user terminal; and D2D communication in which data communication is directly performed among two or more user terminals. The D2D communication is performed by using a part of downlink radio resources of the cellular communication. The downlink radio resources include a specific radio resource that is used in the transmission of a predetermined downlink signal in the cellular communication. The use of the specific radio resource in the D2D communication is regulated.

In one embodiment, a mobile communication system supports: cellular communication in which data communication is performed between a network and a user terminal; and D2D communication in which data communication is directly performed among two or more user terminals. Downlink radio resources of the cellular communication includes a specific subframe for realizing a specific function in the cellular communication. The D2D communication is performed by using at least a part of the specific subframe.

BRIEF DESCRIPTION OF DRAWINGS

FIG. 2 is a block diagram of UE according to the first to sixth embodiments.

FIG. 3 is a block diagram of eNB according to the first to sixth embodiments.

FIG. 9 is a diagram for illustrating an example of a D2D resource assigned in an operation pattern 1 according to the first embodiment.

FIG. 11 is a diagram for illustrating an example of an assignment candidate radio resource in an operation pattern 2 according to the first embodiment.

FIG. 22 is a diagram for illustrating an operation of MeNB according to the sixth embodiment.

DESCRIPTION OF EMBODIMENTS

Overview of First Embodiment

Figure 1:
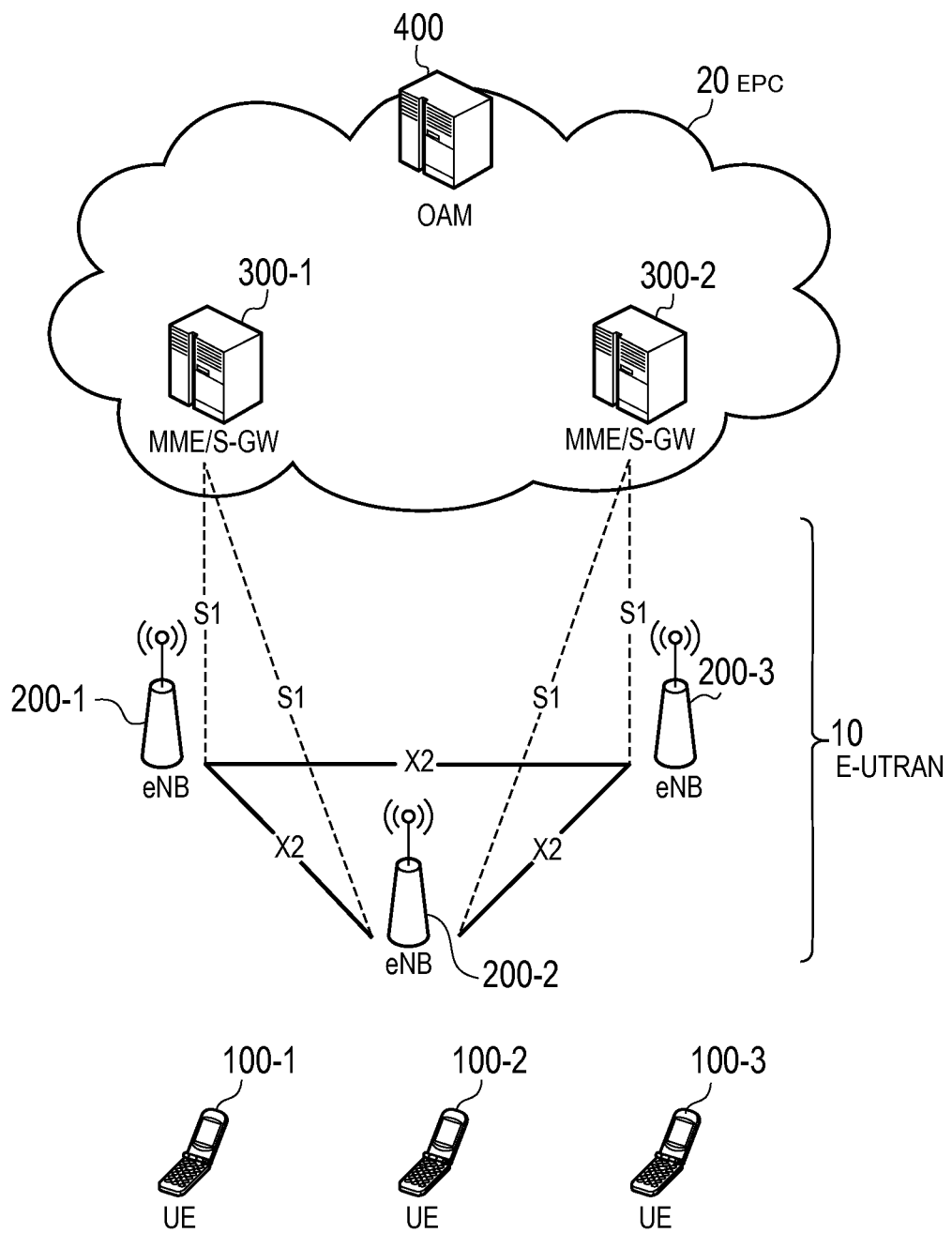
FIG. 1 is a configuration diagram of an LTE system according to first to sixth embodiments.

A mobile communication system according to a first embodiment supports cellular communication in which data communication is performed between a network and a user terminal, and D2D communication in which data communication is directly performed among two or more user terminals. The D2D communication is performed by using a part of uplink radio resources of the cellular communication. The uplink radio resources include a specific radio resource that is used in the transmission of a predetermined uplink signal in the cellular communication. The use of the specific radio resource in the D2D communication is regulated. Therefore, it is possible to restrain the effect of the interference that the uplink of the cellular communication receives from the D2D communication, so that it is possible for the D2D communication to coexist with the cellular communication.

In the first embodiment, the predetermined uplink signal is an uplink reference signal used in at least uplink channel estimation, and the specific radio resource is an uplink reference signal resource. For example, the uplink reference signal is a sounding reference signal (SRS) and/or a demodulation reference signal (DMRS). In such a case, the use of the uplink reference signal resource in a symbol unit is regulated in the D2D communication. By thus regulating the use of the uplink reference signal resource in the D2D communication, the uplink channel estimation can be performed satisfactorily in the cellular communication.

Alternatively, the predetermined uplink signal is an uplink control signal used in the control of the cellular communication, and the specific radio resource is an uplink control signal resource. For example, the uplink control signal is a signal that is transmitted on a physical uplink control channel (PUCCH), and/or a signal that is transmitted on a physical random access channel (PRACH). In such a case, the use of the uplink control signal resource in a resource block unit is regulated in the D2D communication. By thus regulating the use of the uplink control signal resource in the D2D communication, the control of the cellular communication can be performed satisfactorily.

Therefore, it is possible to avoid a situation where the cellular communication is disabled due to the interference from the D2D communication, so that it is possible for the D2D communication to coexist with the cellular communication.

On the other hand, as regard the uplink data (the user data) transmitted on a physical uplink shared channel (PUSCH), because the uplink data is different from the uplink control signal, and can be recovered through retransmission, for example, even upon receiving the interference from the D2D communication, the interference from the D2D communication can be allowed.

In the first embodiment, rather than using the specific radio resource, the D2D communication is performed by using a radio resource other than the specific radio resource from among the uplink radio resources. For example, when D2D resource assignment, which is the radio resource assignment for the D2D communication, is performed at the initiative of a base station, the base station that performs the D2D resource assignment does not assign the specific radio resource to the D2D communication. Alternatively, when D2D resource assignment, which is the radio resource assignment for the D2D communication, is performed at the initiative of a user terminal, the user terminal that performs the D2D resource assignment does not assign the specific radio resource to the D2D communication. Therefore, it is possible to avoid a situation where the uplink control signal receives the interference from the D2D communication.

In the first embodiment, even when the specific radio resource is assigned to a user terminal by the D2D resource assignment, which is the radio resource assignment for the D2D communication, the user terminal to which the specific radio resource is assigned does not use the specific radio resource in the D2D communication. Therefore, it is possible to avoid a situation where the uplink control signal receives the interference from the D2D communication.

On the other hand, when a D2D communication signal is transmitted by using the specific radio resource in the D2D communication, the transmission power of the D2D communication signal corresponding to the specific radio resource is set to a lower value than a predetermined value. For example, when a D2D communication signal is transmitted by using the specific radio resource in the D2D communication, and when the D2D power control, which is the transmission power control for the D2D communication, is performed at the initiative of a base station, the base station that performs the D2D power control sets the transmission power of the D2D communication signal corresponding to the specific radio resource to a lower value than the predetermined value. Alternatively, when a D2D communication signal is transmitted by using the specific radio resource in the D2D communication, and when the D2D power control, which is the transmission power control for the D2D communication, is performed at the initiative of a user terminal, the user terminal that performs the D2D power control sets the transmission power of the D2D communication signal corresponding to the specific radio resource to a lower value than the predetermined value. Therefore, it is possible to restrain the effect of the interference that the uplink control signal receives from the D2D communication.

The user terminal according to the first embodiment is a user terminal in a mobile communication system that supports cellular communication in which data communication is performed between a network and the user terminal, and D2D communication in which data communication is directly performed among two or more user terminals. The D2D communication is performed by using a part of uplink radio resources of the cellular communication. The uplink radio resources include a specific radio resource that is used in the transmission of a predetermined uplink signal in the cellular communication. The user terminal includes a control unit that performs control to regulate the use of the specific radio resource in the D2D communication.

A base station according to the first embodiment is a base station in a mobile communication system that supports cellular communication in which data communication is performed between a network and a user terminal, and D2D communication in which data communication is directly performed among two or more user terminals. The D2D communication is performed by using a part of uplink radio resources of the cellular communication. The uplink radio resources include a specific radio resource that is used in the transmission of a predetermined uplink signal in the cellular communication. The base station includes a control unit that performs control to regulate the use of the specific radio resource in the D2D communication.

First Embodiment

Hereinafter, with reference to the drawings, a description will be provided for an embodiment when the D2D communication is introduced to a mobile communication system (hereinafter, an "LTE system") configured to conform to the 3GPP standards.

(LTE System)

FIG. 1 is a configuration diagram of an LTE system according to the present embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM 400 (Operation and Maintenance).

The MME is a network node for performing various mobility controls, for example, for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 executes various processes and various communication protocols described later.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like of the baseband signal and a CPU that performs various processes by executing the program stored in the memory 230. The processor 240 executes various processes and various communication protocols described later.

Figure 4:
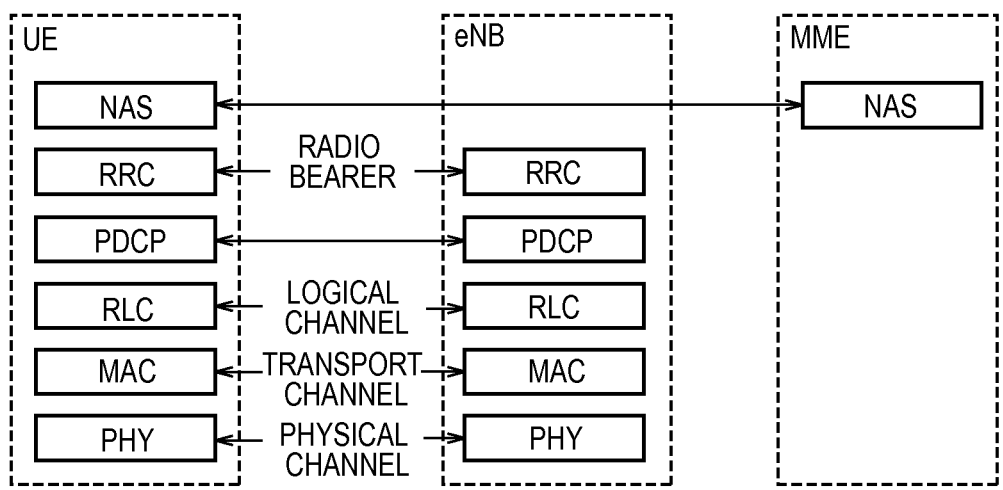
FIG. 4 is a protocol stack diagram of a radio interface in the LTE system according to the first to sixth embodiments.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a MAC scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

Figure 5:
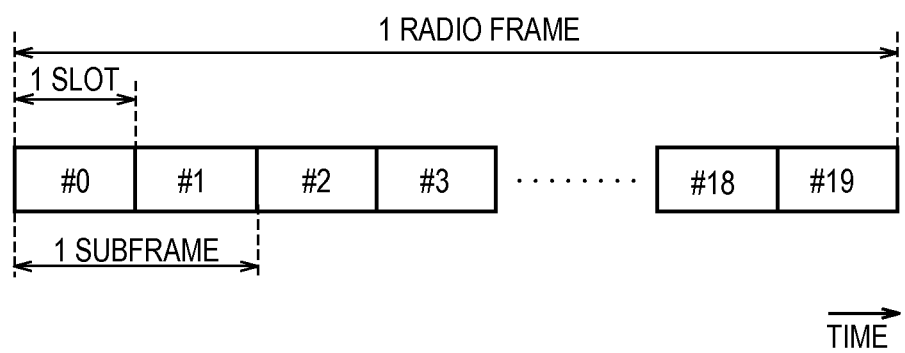
FIG. 5 is a configuration diagram of a radio frame used in the LTE system according to the first to sixth embodiments.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively. As a duplex scheme, either one of a FDD (Frequency Division Duplex) scheme or a TDD (Time Division Duplex) scheme is used. However, in the present embodiment, the FDD scheme is mainly selected.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged. Specifically, the DMRS is arranged at the fourth symbol of each slot in the case of normal CP and is arranged at the third symbol of each slot in the case of expanded CP. The SRS is arranged at the final symbol of a subframe.

Furthermore, in the uplink, a physical random access channel (PRACH) resource that is used in the transmission of a random access signal is arranged. Specifically, in a resource that is notified by SIB (PRACH-Config information elements), six resource blocks are reserved in one specific or in a plurality of subframes, respectively (the same resource blocks are reserved in the case of a plurality of subframes). For example, the PRACH resource is arranged in the resource blocks #42 through #47 of subframes #3 and #8.

The radio resources used in the uplink (the uplink radio resources) include a specific radio resource that is used in the transmission of the uplink reference signal and the uplink control signal. In the present embodiment, the uplink reference signal is the SRS and the DMRS. The uplink control signal is the signal that is transmitted on PUCCH and the signal that is transmitted on PRACH. The details of the uplink reference signal and the uplink control signal will be described later.

(D2D Communication)

Next, description will be provided by comparing the D2D communication with the normal communication (the cellular communication) in the LTE system. In the cellular communication, data communication is performed between the network (the eNB 200) and the UE 100. On the other hand, in the D2D communication, data communication is directly performed among two or more UEs 100.

Figure 6:
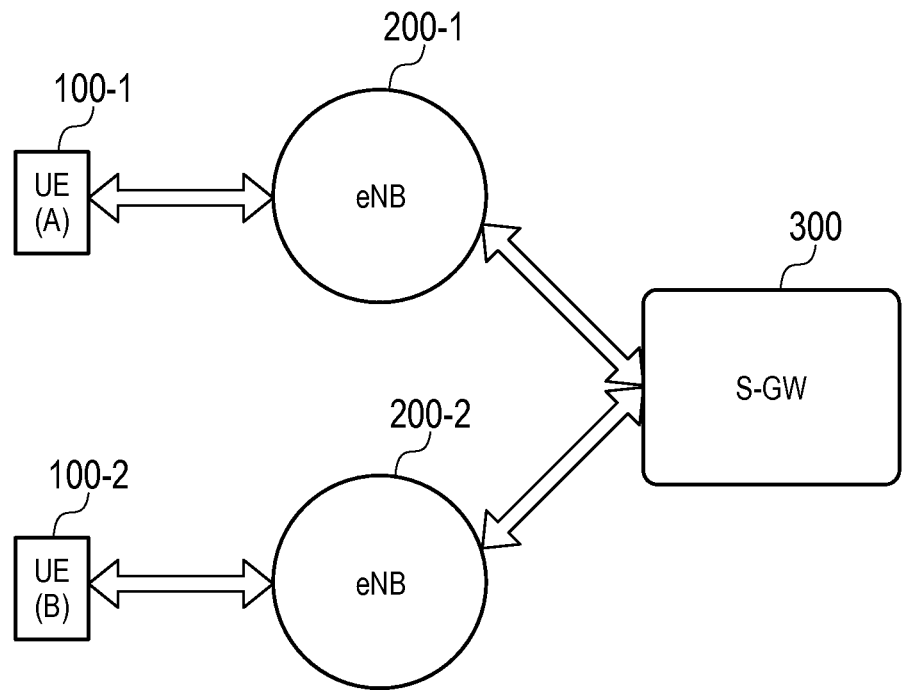
FIG. 6 illustrates a data path in cellular communication according to the first to sixth embodiments.

FIG. 6 illustrates a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

Figure 7:
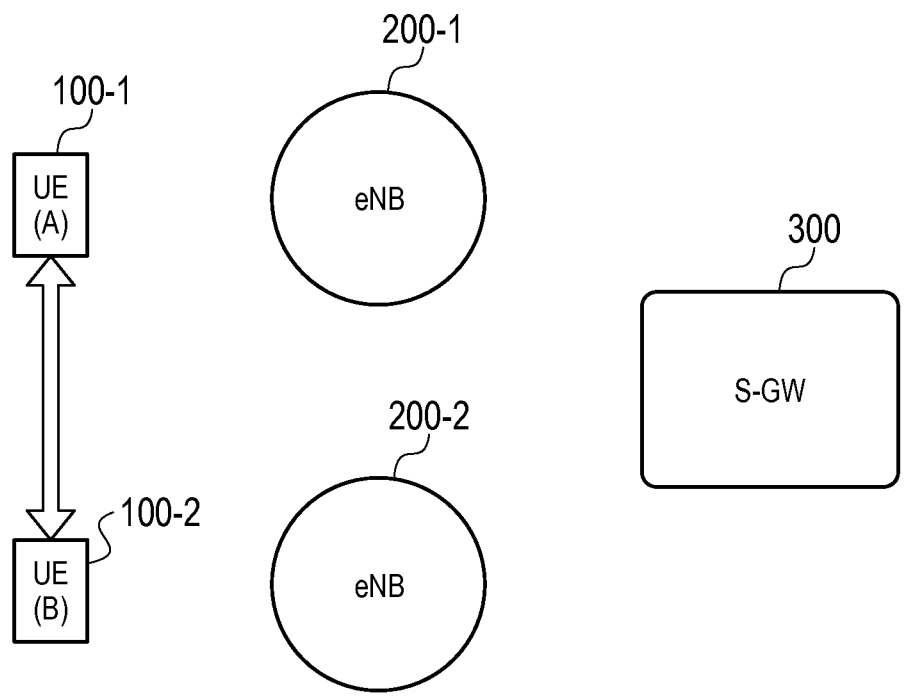
FIG. 7 illustrates a data path in D2D communication according to the first to sixth embodiments.

FIG. 7 illustrates a data path in the D2D communication. In the drawing, a case is illustrated in which the D2D communication is performed between the UE 100-1 that establishes a connection with the eNB 200-1 and the UE 100-2 that establishes a connection with the eNB 200-2.

For example, one UE 100 of the UE 100-1 and the UE 100-2 discovers the other UE 100 existing in the vicinity of the one UE 100, so that the D2D communication starts. It is noted that in order to start the D2D communication, the UE 100 has a (Discover) function of discovering the other UE 100 existing in the vicinity of the UE 100. Furthermore, the UE 100 has a (Discoverable) function discovered by the other UE 100.

As illustrated in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example.

Furthermore, it is assumed that the D2D communication is performed in a frequency band (that is, within a frequency band of the cellular communication) of the LTE system, and for example, in order to avoid interference to the cellular communication, the D2D communication is performed under the control of the network (the eNB 200). In the present embodiment, the D2D communication is performed by using a part of an uplink radio resource of the cellular communication.

Operation According to First Embodiment

Figure 8:
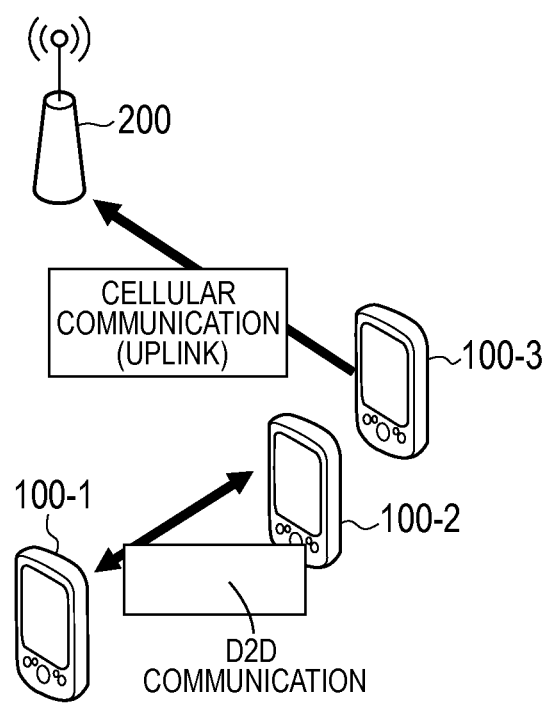
FIG. 8 is a diagram for illustrating a communication environment in which cellular communication and D2D communication are performed simultaneously according to the first embodiment.

Next, an operation according to the present embodiment will be described. FIG. 8 is a diagram for illustrating a communication environment in which the cellular communication and the D2D communication are performed simultaneously.

As illustrated in FIG. 8, the UE 100-1 and the UE 100-2 perform the D2D communication. In contrast, UE 100-3 performs cellular communication with the eNB 200.

As described above, the D2D communication is performed by using a part of the uplink radio resources of the cellular communication. Therefore, when the D2D communication and the cellular communication are performed simultaneously, the uplink of the cellular communication receives the interference from the D2D communication.

Thus, in the present embodiment, rather than using a specific radio resource, the D2D communication is performed by using a radio resource other than the specific radio resource from among the uplink radio resources. The specific radio resource is an uplink reference signal resource that is used in the transmission of an uplink reference signal, and an uplink control signal resource that is used in the transmission of an uplink control signal.

Thus, even when the D2D communication and the cellular communication are performed simultaneously, the uplink reference signal and the uplink control signal do not receive the interference from the D2D communication. Therefore, it is possible to avoid a situation where the cellular communication is disabled due to the interference from the D2D communication, so that it is possible for the D2D communication to coexist with the cellular communication.

Hereinafter, operation patterns 1 and 2 for prohibiting the use of the specific radio resource in the D2D communication will be explained.

(1) Operation Pattern 1

In the operation pattern 1, the D2D resource assignment, which is the radio resource assignment for the D2D communication, is performed at the initiative of the eNB 200. In such a case, the radio resource (D2D resource) used in the D2D communication is determined by the eNB 200. That is, the UE 100 cannot select the D2D resource. The eNB 200 notifies the UE 100 of a D2D resource assigned dynamically or quasi-statically. The UE 100 performs the D2D communication by using the assigned D2D resource.

The eNB 200 that performs the D2D resource assignment assigns, as a D2D resource, a radio resource other than the specific radio resource from among the uplink radio resources. Specifically, the eNB 200 prohibits the use of the specific radio resource in a resource block unit. For example, the eNB 200 assigns, as a D2D resource, a resource block other than the PUCCH resource and the PRACH resource from among the uplink radio resources.

As a result of not using the PUCCH resource for the D2D communication, the various types of control information (ACK/NACK, and CQI, for example) in the cellular communication can be transmitted normally without receiving the interference from the D2D communication. Furthermore, as a result of not using the PUCCH resource for the D2D communication, the UE 100 that is in the middle of the D2D communication can transmit the PUCCH in the cellular communication.

In addition, as a result of not using the PRACH resource for the D2D communication, the random access signal in the cellular communication can be transmitted normally without receiving the interference from the D2D communication.

FIG. 9 is a diagram for illustrating an example of a D2D resource assigned in the operation pattern 1. In the drawing, the uplink radio resources of one radio frame in the uplink frequency band are illustrated.

As illustrated in FIG. 9, the eNB 200 assigns, as the D2D resource, a part of the resource blocks included in the PUSCH resource. This is because the uplink data (the user data) transmitted on the PUSCH can be recovered through retransmission, for example, even upon receiving the interference from the D2D communication, and the interference from the D2D communication can be allowed.

If it is assumed a case where the UE 100-1 and the UE 100-2 perform the D2D communication, the eNB 200 assigns a part of the resource blocks included in the PUSCH resource in a subframe #1 to the data transmission by the UE 100-1 and the data reception by the UE 100-2. Furthermore, the eNB 200 assigns a part of the resource blocks included in the PUSCH resource in a subframe #3 to the data reception by the UE 100-1 and the data transmission by the UE 100-2.

In addition, even if a specific radio resource is assigned by the D2D resource assignment, the UE 100 does not use the specific radio resource in the D2D communication. Specifically, the UE 100 prohibits the use of the specific radio resource in a symbol unit. For example, the UE 100 does not use the SRS resource and the DMRS resource in the D2D communication.

Figure 10:
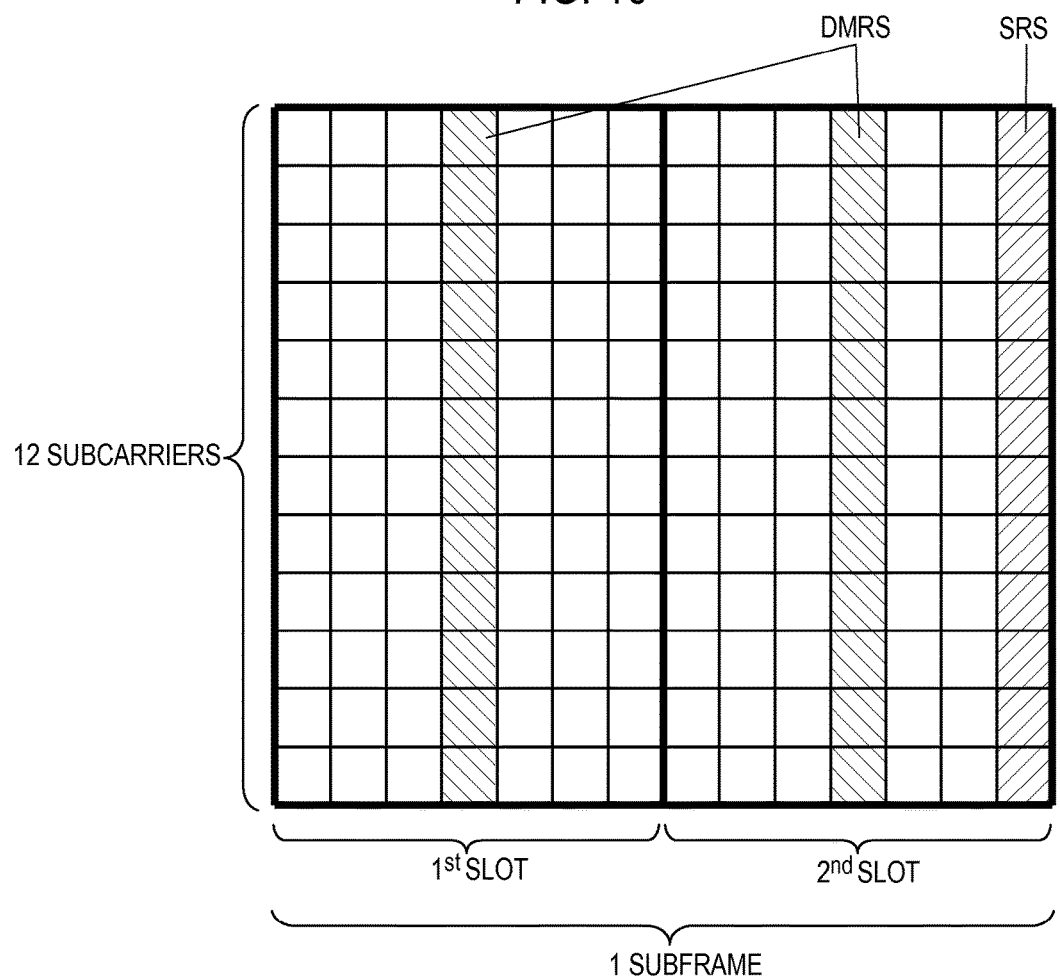
FIG. 10 is a diagram for illustrating an SRS resource and a DMRS resource according to the first embodiment.

FIG. 10 is a diagram for illustrating an SRS resource and a DMRS resource. A case of normal CP setting is illustrated.

As illustrated in FIG. 10, the SRS resource is arranged at the final symbol of a subframe. The DMRS is arranged at the fourth symbol of each slot.

As a result of not using the SRS resource for the D2D communication, the SRS in the cellular communication can be transmitted normally without receiving the interference from the D2D communication. Furthermore, as a result of not using the SRS resource for the D2D communication, the UE 100 that is in the middle of the D2D communication can transmit the SRS in the cellular communication. In addition, because the SRS resource is arranged at the final symbol of a subframe, the symbol period corresponding to the SRS resource may be used as a period for switching the transmission and reception of the D2D communication.

Furthermore, as a result of not using the DMRS resource for the D2D communication, the DMRS in the cellular communication can be transmitted normally without receiving the interference from the D2D communication. Moreover, because the DMRS resource is arranged at the fourth symbol of each slot, the symbol period corresponding to the DMRS resource may be used as a period for switching the transmission and reception of the D2D communication, and the transmission and reception of the D2D communication may be switched in the slot unit.

(2) Operation Pattern 2

In the operation pattern 2, the D2D resource assignment, which is the radio resource assignment for the D2D communication, is performed at the initiative of the UE 100. In such a case, a D2D resource can be selected by the UE 100. The eNB 200 transmits, to the UE 100, information indicating an assignment candidate radio resource, which is a radio resource that can be used in the D2D communication.

Figure 11:
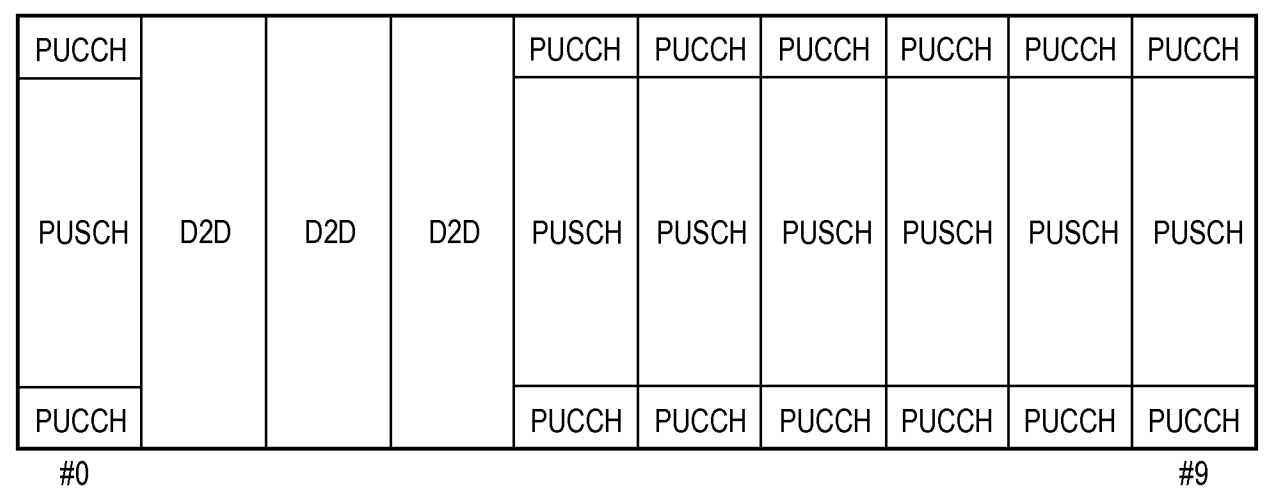

FIG. 11 is a diagram for illustrating an example of an assignment candidate radio resource in the operation pattern 2. In the drawing, the uplink radio resources of one radio frame in the uplink frequency band are illustrated.

As illustrated in FIG. 11, the eNB 200 designates a specific subframe as an assignment candidate radio resource. In the example illustrated in FIG. 11, the subframes #1 through #3 in a radio frame are designated as the assignment candidate radio resource.

The UE 100 autonomously selects a D2D resource from among the assignment candidate radio resources.

The UE 100 that performs the D2D resource assignment assigns, as a D2D resource, a radio resource other than the specific radio resource from among the uplink radio resources. Specifically, the UE 100 prohibits the use of the specific radio resource in a resource block unit. For example, the UE 100 assigns, as a D2D resource, a resource block other than the PUCCH resource and the PRACH resource from among the uplink radio resources.

As a result of not using the PUCCH resource for the D2D communication, the various types of control information (ACK/NACK, and CQI, for example) can be transmitted normally without receiving the interference from the D2D communication. Furthermore, as a result of not using the PUCCH resource for the D2D communication, the UE 100 that is in the middle of the D2D communication can transmit the PUCCH in the cellular communication.

In addition, as a result of not using the PRACH resource for the D2D communication, the random access signal can be transmitted normally without receiving the interference from the D2D communication.

Moreover, same as the operation pattern 1, even if a specific radio resource is assigned by the D2D resource assignment, the UE 100 does not use the specific radio resource in the D2D communication. Specifically, the UE 100 prohibits the use of the specific radio resource in a symbol unit. For example, the UE 100 does not use the SRS resource and the DMRS resource in the D2D communication.

As a result of not using the SRS resource for the D2D communication, the SRS in the cellular communication can be transmitted normally without receiving the interference from the D2D communication. Furthermore, as a result of not using the SRS resource for the D2D communication, the UE 100 that is in the middle of the D2D communication can transmit the SRS in the cellular communication. In addition, because the SRS resource is arranged at the final symbol of a subframe, the symbol period corresponding to the SRS resource may be used as a period for switching the transmission and reception of the D2D communication.

Furthermore, as a result of not using the DMRS resource for the D2D communication, the DMRS in the cellular communication can be transmitted normally without receiving the interference from the D2D communication. Moreover, because the DMRS resource is arranged at the fourth symbol of each slot, the symbol period corresponding to the DMRS resource may be used as a period for switching the transmission and reception of the D2D communication, and the transmission and reception of the D2D communication may be switched in the slot unit.

[Modification]

In the above-described first embodiment, rather than using a specific radio resource (an SRS resource, a DMRS resource, a PUCCH resource, or a PRACH resource), the D2D communication was performed by using a radio resource other than the specific radio resource from among the downlink radio resources. That is, the use of a specific radio resource was prohibited in the D2D communication.

However, instead of prohibiting the use of the specific radio resource in the D2D communication, the specific radio resource may be used by reducing the transmission power.

In other words, when a D2D communication signal is transmitted by using the specific radio resource in the D2D communication, the transmission power of the D2D communication signal corresponding to the specific radio resource is set to a lower value than a predetermined value. Specifically, the transmission power of the resource element included in the specific radio resource is set to a lower value than the transmission power of the other resource elements.

For example, when a D2D communication signal is transmitted by using the specific radio resource in the D2D communication, and when the D2D power control, which is the transmission power control for the D2D communication, is performed at the initiative of the eNB 200, the eNB 200 that performs the D2D power control sets the transmission power of the D2D communication signal corresponding to the specific radio resource to a lower value than a predetermined value.

In contrast, when a D2D communication signal is transmitted by using the specific radio resource in the D2D communication, and when the D2D power control, which is the transmission power control for the D2D communication, is performed at the initiative of the UE 100, the UE 100 that performs the D2D power control sets the transmission power of the D2D communication signal corresponding to the specific radio resource to a lower value than a predetermined value.

Overview of Second and Third Embodiments

A mobile communication system according to second and third embodiments supports cellular communication in which data communication is performed between a network and a user terminal, and D2D communication in which data communication is directly performed among two or more user terminals. The D2D communication is performed by using a part of downlink radio resources of the cellular communication. The downlink radio resources include a specific radio resource that is used in the transmission of a predetermined downlink signal in the cellular communication. The use of the specific radio resource in the D2D communication is regulated. Therefore, the effect of the interference received by the downlink of the cellular communication from the D2D communication can be controlled, which enables the coexistence of the D2D communication together with the cellular communication.

In the second embodiment, the predetermined downlink signal is a downlink control signal that is used in the control of the cellular communication. For example, the downlink control signal is a synchronization signal, and/or a signal that is transmitted on a physical broadcast channel (PBCH). Therefore, the difficulty in controlling the cellular communication due to the interference from the D2D communication can be avoided, which enables the coexistence of the D2D communication together with the cellular communication. On the other hand, as regard the downlink data (the user data) transmitted on a physical downlink shared channel (PDSCH), because the downlink data is different from the downlink control signal, and can be recovered through retransmission, for example, even upon receiving the interference from the D2D communication, the interference from the D2D communication can be allowed.

In the third embodiment, the predetermined downlink signal is an MBMS (Multimedia Broadcast Multicast Service) signal. Furthermore, the specific radio resource is an MBSFN (MBMS Single Frequency Network) subframe. Thus, by not using the MBSFN subframe in the D2D communication, the user terminal can receive the MBMS signal transmitted in the MBSFN subframe even when the D2D communication is performed. Therefore, the D2D communication can coexist with the MBMS.

In the second embodiment and the third embodiment, rather than using the specific radio resource, the D2D communication is performed by using a radio resource other than the specific radio resource from among the downlink radio resources. For example, when D2D resource assignment, which is the radio resource assignment for the D2D communication, is performed at the initiative of a base station, the base station that performs the D2D resource assignment does not assign the specific radio resource to the D2D communication. Alternatively, when D2D resource assignment, which is the radio resource assignment for the D2D communication, is performed at the initiative of a user terminal, the user terminal that performs the D2D resource assignment does not assign the specific radio resource to the D2D communication. In addition, even when the specific radio resource is assigned to a user terminal by the D2D resource assignment, which is the radio resource assignment for the D2D communication, the user terminal to which the specific radio resource is assigned does not use the specific radio resource in the D2D communication. Therefore, the difficulty in controlling the cellular communication due to the interference from the D2D communication can certainly be avoided.

According to a modification of the second embodiment, when a D2D communication signal is transmitted by using the specific radio resource in the D2D communication, the transmission power of the D2D communication signal corresponding to the specific radio resource is set to a lower value than a predetermined value. For example, when a D2D communication signal is transmitted by using the specific radio resource in the D2D communication, and when the D2D power control, which is the transmission power control for the D2D communication, is performed at the initiative of a base station, the base station that performs the D2D power control sets the transmission power of the D2D communication signal corresponding to the specific radio resource to a lower value than a predetermined value. Alternatively, when a D2D communication signal is transmitted by using the specific radio resource in the D2D communication, and when the D2D power control, which is the transmission power control for the D2D communication, is performed at the initiative of a user terminal, the user terminal that performs the D2D power control sets the transmission power of the D2D communication signal corresponding to the specific radio resource to a lower value than a predetermined value.

The user terminal according to the second and third embodiments is a user terminal in a mobile communication system that supports cellular communication in which data communication is performed between a network and the user terminal, and D2D communication in which data communication is directly performed among two or more user terminals. The D2D communication is performed by using a part of downlink radio resources of the cellular communication. The downlink radio resources include a specific radio resource that is used in the transmission of a predetermined downlink signal in the cellular communication. The user terminal includes a control unit that performs control to regulate the use of the specific radio resource in the D2D communication.

A base station according to the second and third embodiments is a base station in a mobile communication system that supports cellular communication in which data communication is performed between a network and a user terminal, and D2D communication in which data communication is directly performed among two or more user terminals. The D2D communication is performed by using a part of downlink radio resources of the cellular communication. The downlink radio resources include a specific radio resource that is used in the transmission of a predetermined downlink signal in the cellular communication. The base station includes a control unit that performs control to regulate the use of the specific radio resource in the D2D communication.

A processor according to the second and third embodiments is provided in a user terminal in a mobile communication system that supports cellular communication in which data communication is performed between a network and a user terminal, and D2D communication in which data communication is directly performed among two or more user terminals. The D2D communication is performed by using a part of downlink radio resources of the cellular communication. The downlink radio resources include a specific radio resource that is used in the transmission of a predetermined downlink signal in the cellular communication. The processor performs process to regulate the use of the specific radio resource in the D2D communication.

A processor according to the second and third embodiments is provided in a base station in a mobile communication system that supports cellular communication in which data communication is performed between a network and a user terminal, and D2D communication in which data communication is directly performed among two or more user terminals. The D2D communication is performed by using a part of downlink radio resources of the cellular communication. The downlink radio resources include a specific radio resource that is used in the transmission of a predetermined downlink signal in the cellular communication. The processor performs process to regulate the use of the specific radio resource in the D2D communication.

Second Embodiment

The second embodiment will be described while focusing on differences with aforementioned first embodiment. The system configuration of the second embodiment is similar to the first embodiment.

Although the first embodiment mainly focuses on an uplink, the second embodiment mainly focuses on a downlink.

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSs) are distributed and arranged.

The radio resource used in the downlink (the downlink radio resource) includes a specific radio resource used in the transmission of a downlink control signal (a predetermined downlink signal) that is used in the control of the cellular communication. In the present embodiment, the downlink control signal is a synchronization signal, and/or a signal that is transmitted on a physical broadcast channel (PBCH). The synchronization signal includes a primary synchronization signal (PSS) and a secondary synchronization signal (SSS). The details of the downlink control signal will be described later.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged. Specifically, the DMRS is arranged at the fourth symbol of each slot in the case of normal CP and is arranged at the third symbol of each slot in the case of expanded CP. The SRS is arranged at the final symbol of a subframe.

(D2D Communication)

The LTE system according to the second embodiment supports the D2D communication similar to the first embodiment. It is assumed that the D2D communication is performed in a frequency band (that is, within a frequency band of the cellular communication) of the LTE system, and for example, in order to avoid interference to the cellular communication, the D2D communication is performed under the control of the network (the eNB 200). In the present embodiment, the D2D communication is performed by using a part of the downlink radio resources of the cellular communication.

Operation According to Second Embodiment

Figure 12:
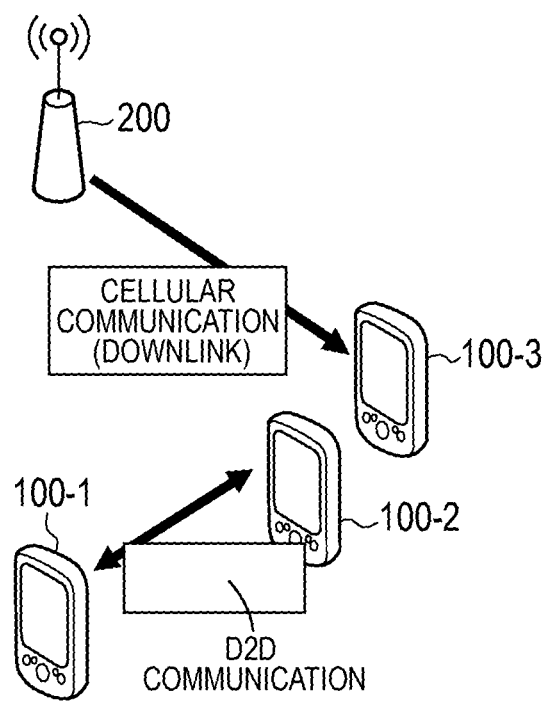
FIG. 12 is a diagram for illustrating a communication environment in which cellular communication and D2D communication are performed simultaneously according to the second and third embodiments.

Next, an operation according to the present embodiment will be described. FIG. 12 is a diagram for illustrating a communication environment in which the cellular communication and the D2D communication are performed simultaneously.

As illustrated in FIG. 12, the UE 100-1 and the UE 100-2 perform the D2D communication. In contrast, UE 100-3 performs cellular communication with the eNB 200.

As described above, the D2D communication is performed by using a part of the downlink radio resources of the cellular communication. Therefore, when the D2D communication and the cellular communication are performed simultaneously, the downlink of the cellular communication receives the interference from the D2D communication.

Thus, in the present embodiment, rather than using a specific radio resource, the D2D communication is performed by using a radio resource other than the specific radio resource from among the downlink radio resources. That is, the use of a specific radio resource is prohibited in the D2D communication.

The specific radio resource is a radio resource used in the transmission of a downlink control signal that is used in the control of the cellular communication. The downlink control signal is a synchronization signal, and/or a signal that is transmitted on the PBCH. The synchronization signal is a signal that is used in establishing synchronization, and includes PSS and SSS. The signal transmitted on PBCH, for example, is a master information block (MIB).

Figure 13:
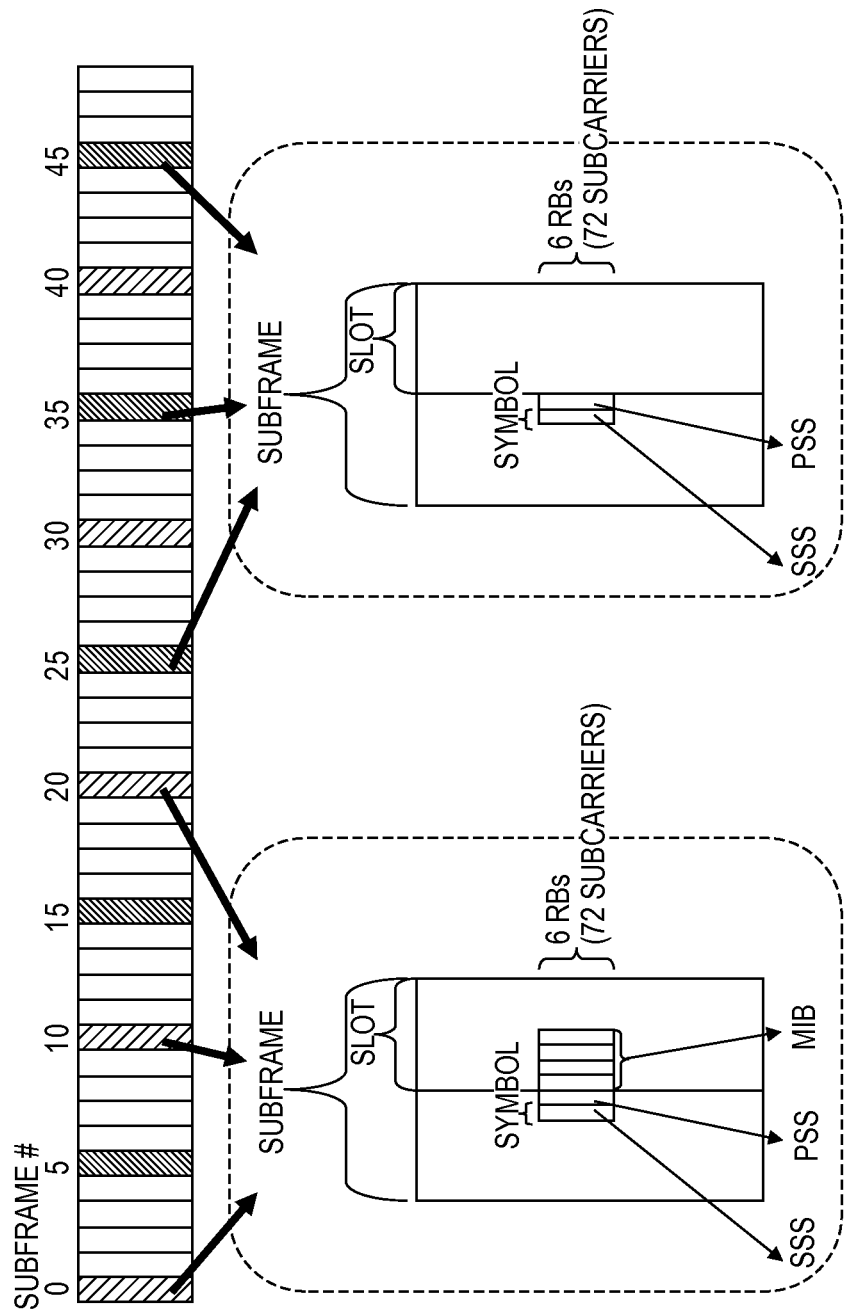
FIG. 13 is a diagram for illustrating a specific radio resource (a PSS resource, an SSS resource, and a PBCH resource) according to the second embodiment.

FIG. 13 is a diagram for illustrating a specific radio resource (a PSS resource, an SSS resource, and a PBCH resource) according to the present embodiment.

As illustrated in FIG. 13, the PSS resource, the SSS resource, and the PBCH resource are arranged in the center six resource blocks of a downlink frequency band in a frequency direction. The PSS resource is arranged, in the time direction, at the last OFDM symbol in the first half slot for every five subframes. The SSS resource is arranged at the second last (that is, immediately before the PSS resource) OFDM symbol in the same slot as the PSS resource. The PBCH resource is arranged at the four OFDM symbols from the head of the latter half slot of every 10 subframes (one radio frame).

When the UE 100 receives the PSS and the SSS normally, the UE 100 can become synchronous with the cell. Furthermore, after the completion of the cell search, when the UE 100 receives the system information from the cell normally, the UE 100 acquires the information necessary for establishing a connection with the cell from the system information, and performs the process for connecting to the cell. The system information includes MIB and a system information block (SIB). The MIB includes the basic information of the cell and the information necessary for receiving the SIB. The SIB is transmitted by using the PDSCH. The SIB includes the information necessary for establishing a connection with the cell.

Thus, in order to establish a connection with the cell, the UE 100 must first receive the downlink control signal (PSS, SSS, MIB) from the cell.

In the present embodiment, because the use of a specific radio resource (a PSS resource, an SSS resource, and a PBCH resource) is prohibited in the D2D communication, the downlink control signal (PSS, SSS, and MIB) does not receive the interference from the D2D communication. Therefore, the disabling of the cellular communication due to the interference from the D2D communication can be avoided, which enables the coexistence of the D2D communication together with the cellular communication.

Hereinafter, operation patterns 1 and 2 according to the present embodiment will be explained.

(1) Operation Pattern 1

In the operation pattern 1, the D2D resource assignment, which is the radio resource assignment for the D2D communication, is performed at the initiative of the eNB 200. In such a case, the radio resource (D2D resource) used in the D2D communication is determined by the eNB 200. That is, the UE 100 has no selection right of the D2D resource. The eNB 200 notifies the UE 100 of a D2D resource assigned dynamically or quasi-statically. The UE 100 performs the D2D communication by using the assigned D2D resource.

In the operation pattern 1, the eNB 200 that performs the D2D resource assignment assigns a radio resource other than the specific radio resource from among the downlink radio resources, as a D2D resource. In such a case, the eNB 200 can prohibit the use of the specific radio resource in a resource block unit. Specifically, the eNB 200 assigns a resource block other than the center six resource blocks including the specific radio resource, as the D2D resource.

Alternatively, even if a specific radio resource is assigned by the D2D resource assignment, the UE 100 does not use the specific radio resource in the D2D communication. In such a case, the UE 100 can prohibit the use of the specific radio resource in a symbol unit. Specifically, the UE 100 does not use the symbol interval corresponding to the specific radio resource in the D2D communication. Alternatively, instead of prohibiting in the symbol unit, the UE 100 may prohibit the use of the specific radio resource in the resource block unit. For example, even if the specific radio resource is assigned, the UE 100 ignores the specific radio resource.

(2) Operation Pattern 2

In the operation pattern 2, the D2D resource assignment, which is the radio resource assignment for the D2D communication, is performed at the initiative of the UE 100. In such a case, a D2D resource can be selected by the UE 100.

The eNB 200 transmits, to the UE 100, information indicating an assignment candidate radio resource, which is a radio resource that can be used in the D2D communication. The UE 100 autonomously selects a D2D resource from among the assignment candidate radio resources.

In the operation pattern 2, the UE 100 that performs the D2D resource assignment assigns a radio resource other than the specific radio resource from among the downlink radio resources, as a D2D resource. In such a case, the UE 100 can prohibit the use of the specific radio resource in a resource block unit. Specifically, the UE 100 assigns a resource block other than the center six resource blocks including the specific radio resource, as the D2D resource.

Alternatively, even if a specific radio resource is assigned by the D2D resource assignment, the UE 100 does not use the specific radio resource in the D2D communication. In such a case, the UE 100 can prohibit the use of the specific radio resource in a symbol unit. Specifically, the UE 100 does not use the symbol interval corresponding to the specific radio resource in the D2D communication. Alternatively, instead of prohibiting in the symbol unit, the UE 100 may prohibit the use of the specific radio resource in the resource block unit. For example, even if the specific radio resource is assigned, the UE 100 ignores the specific radio resource.

Third Embodiment

In the above-described second embodiment, the specific radio resource of which the use is prohibited in the D2D communication is a PSS resource used in the transmission of PSS, an SSS resource used in the transmission of SSS, and a PBCH resource used in the transmission of MIB.

In contrast, in the third embodiment, the specific radio resource of which the use is prohibited in the D2D communication is an MBSFN subframe used in the transmission of an MBMS signal.

(MBMS Function)

The MBMS function in an LTE system will be described next. The MBMS function provides a bearer service that realizes a broadcasting distribution. According to the MBMS function, it is possible to transmit MBMS signals by a common bearer simultaneously to a plurality of UEs 100 that show an interest in the MBMS service.

In the LTE system, a plurality of eNBs 200 (a plurality of cells) configure an MBSFN (MBMS Single Frequency Network). Each eNB 200 configuring the MBSFN synchronously transmits the same MBMS signals simultaneously in an MBSFN subframe. Thereby, the UE 100 is capable of synthesizing the MBMS signals transmitted from each eNB 200 into RF (Radio Frequency). Furthermore, through the simultaneous reception of the MBMS signals by a plurality of UEs 100 in a common frequency band, the radio resources can be saved.

As described above, the D2D communication is performed by using a part of the downlink radio resources of the cellular communication. Therefore, when the UE 100 performs the D2D communication in an MBSFN subframe, the UE 100 cannot receive the MBMS signal even if the UE 100 desires the reception of an MBMS signal.

Thus, in the present embodiment, rather than using the MBSFN subframe, the D2D communication is performed by using a subframe other than an MBSFN subframe from among the downlink radio resources. That is, the use of the MBSFN subframe is prohibited in the D2D communication. Therefore, even if the D2D communication is performed, the UE 100 can receive an MBMS signal.

Figure 14:
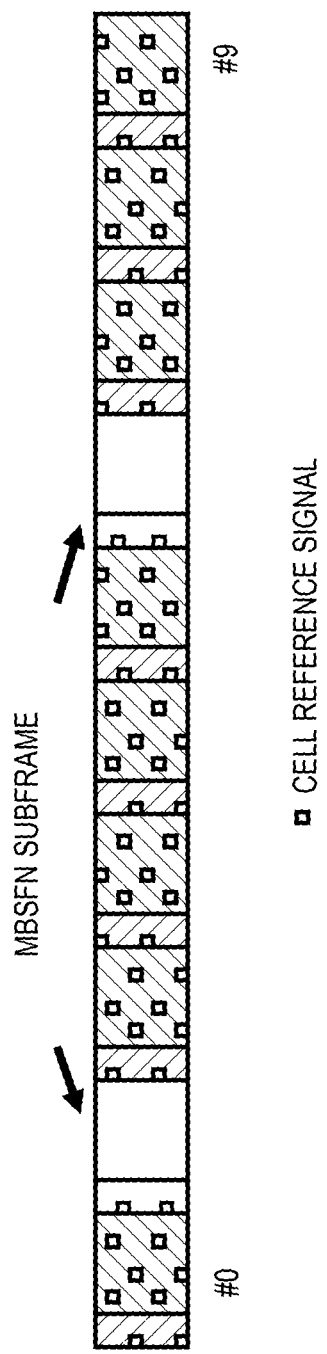
FIG. 14 is a diagram for illustrating a specific radio resource (an MBSFN subframe) according to the third embodiment.

FIG. 14 is a diagram for illustrating a specific radio resource (an MBSFN subframe) according to the present embodiment.

As illustrated in FIG. 14, in a downlink radio frame, subframes having the subframe numbers #1 and #6 can be set as MBSFN subframes. Subframes other than those having the subframe numbers #1 and #6 are normal subframes.

Operation According to Third Embodiment

Hereinafter, operation patterns 1 and 2 according to the present embodiment will be explained.

(1) Operation Pattern 1

In the operation pattern 1, the D2D resource assignment, which is the radio resource assignment for the D2D communication, is performed at the initiative of the eNB 200. In such a case, the radio resource (D2D resource) used in the D2D communication is determined by the eNB 200. That is, the UE 100 has no selection right of the D2D resource. The eNB 200 notifies the UE 100 of a D2D resource assigned dynamically or quasi-statically. The UE 100 performs the D2D communication by using the assigned D2D resource.

In the operation pattern 1, the eNB 200 that performs the D2D resource assignment assigns a radio resource other than the specific radio resource from among the downlink radio resources, as a D2D resource. Specifically, the eNB 200 assigns a resource block other than the resource block included in the MBSFN subframe as the D2D resource.

Alternatively, even if the resource block included in the MBSFN subframe is assigned by the D2D resource assignment, the UE 100 does not use the resource block included in the MBSFN subframe in the D2D communication. Alternatively, even if the resource block included in the MBSFN subframe is assigned by the D2D resource assignment, the UE 100 does not use the resource block included in the MBSFN subframe in the D2D communication if the reception of an MBMS signal is desired.

(2) Operation Pattern 2

In the operation pattern 2, the D2D resource assignment, which is the radio resource assignment for the D2D communication, is performed at the initiative of the UE 100. In such a case, a D2D resource can be selected by the UE 100. The eNB 200 transmits, to the UE 100, information indicating an assignment candidate radio resource, which is a radio resource that can be used in the D2D communication. The UE 100 autonomously selects a D2D resource from among the assignment candidate radio resources.

In the operation pattern 2, the UE 100 that performs the D2D resource assignment assigns a radio resource other than the specific radio resource from among the downlink radio resources, as a D2D resource. Specifically, the UE 100 assigns a resource block other than the resource block included in the MBSFN subframe as the D2D resource. It must be noted that when the reception of an MBMS signal is desired, the UE 100 that performs the D2D resource assignment may assign a radio resource other than the specific radio resource from among the downlink radio resources, as a D2D resource.

Alternatively, even if the specific radio resource is assigned, the UE 100 ignores the same. In such a case, if a D2D resource assignment that is not desired at the assigned side (the UE 100) is performed, the MBMS reception can be prioritized.

[Modification]

For example, the aforementioned second embodiment and third embodiment may be performed separately and independently, and may also be combined and embodied.

In the above-described second embodiment, rather than using a specific radio resource (a PSS resource, an SSS resource, and a PBCH resource), the D2D communication is performed by using a radio resource other than the specific radio resource from among the downlink radio resources. That is, the use of a specific radio resource is prohibited in the D2D communication.

However, as a modification of the second embodiment, the specific radio resource may be used with reducing the transmission power.

In other words, when a D2D communication signal is transmitted by using the specific radio resource in the D2D communication, the transmission power of the D2D communication signal corresponding to the specific radio resource is set to a lower value than a predetermined value. Specifically, the transmission power of the resource element included in the specific radio resource is set to a lower value than the transmission power of the other resource elements. The predetermined value can be decided as described below. The first method is a method in which the predetermined value is decided statically. The second method is a method in which the predetermined value is decided dynamically. In addition, in the second method, the predetermined value may be implicitly specified from the eNB 200, or a relative value (decided statically) corresponding to another signal (designated for the D2D communication, for example) may be used. If the predetermined value is implicitly specified from the eNB 200, the value may be directly notified, or a relative value corresponding to another signal, for example, (a transmission power designated for the D2D communication, for example) may be notified.

For example, when a D2D communication signal is transmitted by using the specific radio resource in the D2D communication, and when the D2D power control, which is the transmission power control for the D2D communication, is performed at the initiative of the eNB 200, the eNB 200 that performs the D2D power control sets the transmission power of the D2D communication signal corresponding to the specific radio resource to a lower value than a predetermined value.

In contrast, when a D2D communication signal is transmitted by using the specific radio resource in the D2D communication, and when the D2D power control, which is the transmission power control for the D2D communication, is performed at the initiative of the UE 100, the UE 100 that performs the D2D power control sets the transmission power of the D2D communication signal corresponding to the specific radio resource to a lower value than a predetermined value.

Overview of Fourth to Sixth Embodiments

A mobile communication system according to fourth to sixth embodiments supports cellular communication in which data communication is performed between a network and a user terminal, and D2D communication in which data communication is directly performed among two or more user terminals. A downlink radio resource of the cellular communication includes specific subframes for realizing specific functions in the cellular communication. The D2D communication is performed by using at least a part of the specific subframes. Therefore, by utilizing the specific subframes used for cellular communication in the D2D communication, the coexistence of cellular communication and the D2D communication can be achieved.

In fourth and fifth embodiments, the specific function is an MBMS (Multimedia Broadcast Multicast Service) function. Furthermore, the specific subframe is MBSFN (MBMS Single Frequency Network) subframe. Therefore, by utilizing the MBSFN subframes for the D2D communication, the coexistence of cellular communication and the D2D communication can be achieved, which enables an efficient operation of the radio resource.

In the fourth embodiment, a base station that performs radio resource assignment for the D2D communication controls whether or not to assign at least a part of the MBSFN subframes to the D2D communication on the basis of MBMS interest information notified from the user terminal accommodated in the base station. Therefore, depending on the status of interest in the MBMS at the user terminal, it is possible to appropriately control whether or not to use the MBSFN subframes in the D2D communication.

In the fourth embodiment, the MBMS interest information includes the frequency information indicating the frequency of distribution of the MBMS data that the user terminal desires to receive. The base station controls whether or not to assign at least a part of the MBSFN subframes to the D2D communication on the basis of the frequency information included in the MBMS interest information. Therefore, the MBSFN subframes belonging to the frequency (carrier) in which the user terminal does not show an interest can be utilized for the D2D communication.

In the fifth embodiment, a base station that performs radio resource assignment for the D2D communication controls whether or not to assign at least a part of the MBSFN subframes to the D2D communication on the basis of MBMS counting information notified from the user terminal accommodated in the base station. Therefore, depending on the status of reception of the MBMS data in the user terminal, it is possible to appropriately control whether or not to use the MBSFN subframes in the D2D communication.

In the sixth embodiment, the specific function is an ICIC (Inter-Cell Interference Coordination) function. Furthermore, the specific subframe is ABS (Almost Blank Subframe). The ABS is a subframe which is rendered approximately blank (Almost Blank) in order to avoid the interference among cells, and in which the cellular communication is regulated. Therefore, by utilizing the ABS for the D2D communication, the coexistence of the cellular communication and the D2D communication can be achieved, which enables an efficient operation of the radio resource.

In the sixth embodiment, a base station that performs radio resource assignment for the D2D communication assigns at least a part of the ABSs to the D2D communication if the ABSs are set. Therefore, depending on the setup status of the ABS, it is possible to appropriately control whether or not to use the ABS in the D2D communication.

The user terminal according to the fourth to sixth embodiments is a user terminal in a mobile communication system that supports cellular communication in which data communication is performed between a network and the user terminal, and D2D communication in which data communication is directly performed among two or more user terminals. A downlink radio resource of the cellular communication includes specific subframes for realizing specific functions in the cellular communication. The user terminal includes a control unit that performs control to perform the D2D communication by using at least a part of the specific subframes.

A base station according to the fourth to sixth embodiments is a base station in a mobile communication system that supports cellular communication in which data communication is performed between a network and a user terminal, and D2D communication in which data communication is directly performed among two or more user terminals. A downlink radio resource of the cellular communication includes specific subframes for realizing specific functions in the cellular communication. The base station includes a control unit that performs control to perform the D2D communication by using at least a part of the specific subframes.

A processor according to the fourth to sixth embodiments is provided in a user terminal in a mobile communication system that supports cellular communication in which data communication is performed between a network and a user terminal, and D2D communication in which data communication is directly performed among two or more user terminals. A downlink radio resource of the cellular communication includes specific subframes for realizing specific functions in the cellular communication. The processor performs a process for performing the D2D communication by using at least a part of the specific subframes.

A processor according to the fourth to sixth embodiments is provided in a base station in a mobile communication system that supports cellular communication in which data communication is performed between a network and a user terminal, and D2D communication in which data communication is directly performed among two or more user terminals. A downlink radio resource of the cellular communication includes specific subframes for realizing specific functions in the cellular communication. The processor performs a process for performing the D2D communication by using at least a part of the specific subframes.

Fourth Embodiment

The fourth embodiment will be described while focusing on differences with aforementioned each embodiment. The system configuration of the second embodiment is similar to the first embodiment.

In the present embodiment, the D2D communication is performed by using a part of the downlink radio resource of the cellular communication.

The methods of assigning the radio resource (D2D resource) used in the D2D communication include the two methods described below.

The first method is the method by which D2D resource assignment is performed at the initiative of the eNB 200. In this case, the eNB 200 determines a D2D resource. That is, the UE 100 has no selection right of the D2D resource. The eNB 200 notifies the UE 100 of a D2D resource assigned dynamically or quasi-statically. The UE 100 performs the D2D communication by using the assigned D2D resource.

The second method is the method by which D2D resource assignment is performed at the initiative of the UE 100. In such a case, a D2D resource can be selected by the UE 100. The eNB 200 transmits, to the UE 100, information indicating an assignment candidate radio resource, which is a radio resource that can be used in the D2D communication. The UE 100 autonomously selects a D2D resource from among the assignment candidate radio resources. Hereinafter, the term "D2D resource" is a concept that includes the assignment candidate radio resource.

(MBMS Function)

The MBMS function in an LTE system will be described next. The MBMS function provides a bearer service that realizes a broadcasting distribution. According to the MBMS function, it is possible to transmit MBMS data by a common bearer simultaneously to a plurality of UEs 100 that show an interest in the MBMS service.

In the LTE system, a plurality of eNBs 200 (a plurality of cells) configure MBSFN (MBMS Single Frequency Network). Each eNB 200 configuring the MBSFN synchronously transmits the same MBMS data simultaneously in an MBSFN subframe.

Thereby, the UE 100 is capable of synthesizing the MBMS data transmitted from each eNB 200 into RF (Radio Frequency). Furthermore, because a plurality of UEs 100 receive the MBMS data by using a common radio resource, the radio resources can be saved.

Figure 15:
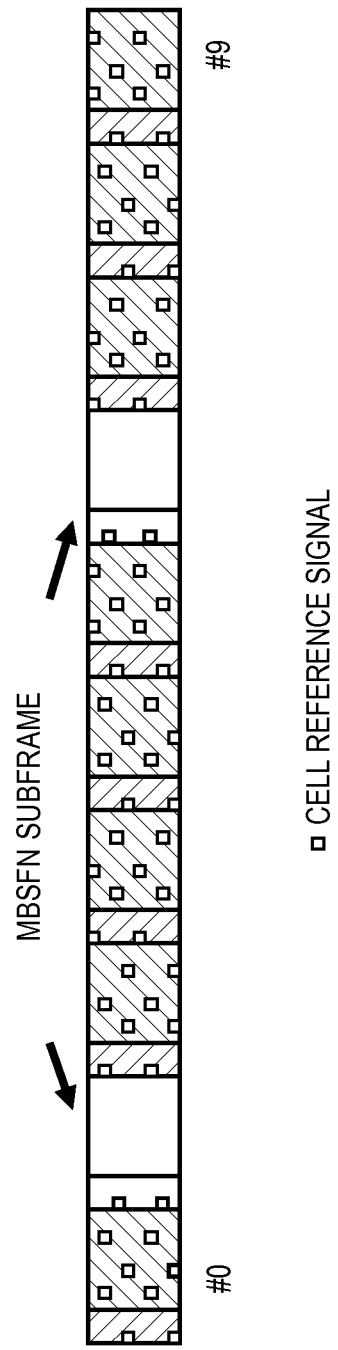
FIG. 15 is a diagram for illustrating an MBSFN subframe according to the fourth embodiment.

FIG. 15 is a diagram for illustrating an MBSFN subframe.

As illustrated in FIG. 15, in a downlink radio frame, for example, subframes having the subframe numbers #1 and #6 can be set as MBSFN subframes. Subframes other than those having the subframe numbers #1 and #6 are normal subframes.

Operation According to Fourth Embodiment

Next, an operation according to the present embodiment will be described. In the present embodiment, a case in which the downlink is operated at a plurality of frequencies (multi-carrier), and different MBMS data (MBMS channel) is delivered in each frequency is assumed. Furthermore, a case in which the same UE 100 uses both the D2D communication and the cellular communication is assumed.

Figure 16:
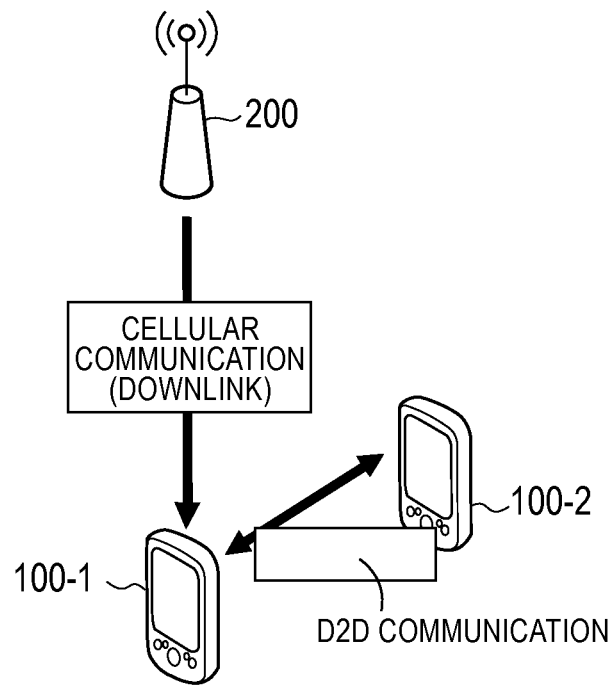
FIG. 16 is a diagram for illustrating a communication environment according to the fourth embodiment.

FIG. 16 is a diagram for illustrating a communication environment according to the present embodiment.

As illustrated in FIG. 16, the UE 100-1 and the UE 100-2 are located in the cell of the eNB 200, and are accommodated in the eNB 200. Furthermore, the UE 100-1 and the UE 100-2 perform the D2D communication by using a D2D resource that is assigned from the eNB 200.

The UE 100-1 performs the cellular communication with the eNB 200 by using a radio resource that is assigned from the eNB 200. Furthermore, the UE 100-1 either desires the reception of the MBMS data, or receives the MBMS data.

The eNB 200 performs D2D resource assignment to the D2D communication by the UE 100-1 and the UE 100-2, and radio resource assignment to the cellular communication by the UE 100-1. Furthermore, the eNB 200 delivers MBMS data different for each frequency in the downlink.

Figure 17:
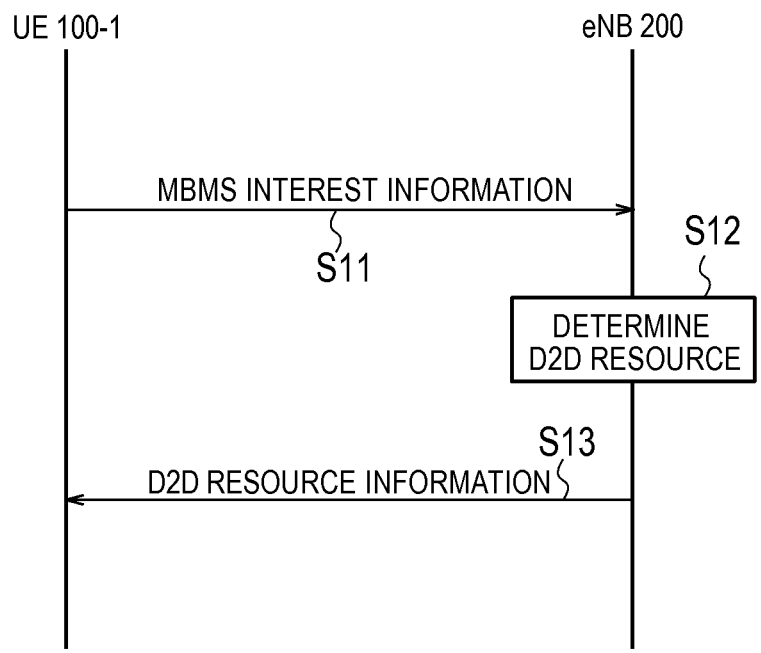
FIG. 17 is an operation sequence diagram according to the fourth embodiment.

FIG. 17 is an operation sequence diagram according to the present embodiment. An operation under the communication environment illustrated in FIG. 16 will be described.

As illustrated in FIG. 17, in step S11, the UE 100-1 transmits, to the eNB 200, MBMS interest information (MBMS Interest Indication), which is one of the RRC messages. The eNB 200 receives the MBMS interest information from the UE 100-1.

The MBMS interest information includes frequency information indicating the frequency of distribution of the MBMS data that the UE 100-1 desires to receive.

The MBMS interest information can identify the MBMS data that the UE 100-1 desires to receive only by the frequency level. Therefore, in the present embodiment, it must be taken into consideration that the eNB 200 cannot understand which MBMS data (MBMS channel) the UE 100-1 desires to receive.

In the current specifications, the below two transmission triggers are stipulated for the MBMS interest information.

Firstly, the UE having an interest in the MBMS transmits the MBMS interest information when establishing an RRC connection, that is, when transiting from an idle state (RRC Idle State) to a connected state (RRC connected state).

Secondly, the UE transmits updated MBMS interest information when the MBMS frequency in which the UE shows the interest is changed in a connected state. Specifically, when changing the MBMS frequency in which the UE shows the interest from a time point at which the MBMS interest information was transmitted last (previous time), the UE transmits the updated MBMS interest information.

In step S12, the eNB 200 determines a D2D resource to be assigned to the D2D communication by the UE 100-1 and the UE 100-2. On the basis of the MBMS interest information received in step S11, the eNB 200 controls whether or not to assign at least a part of the MBSFN subframes to the D2D communication.

In the present embodiment, the eNB 200 controls whether or not to assign at least a part of the MBSFN subframes to the D2D communication on the basis of the frequency information included in the MBMS interest information. Specifically, if there exist MBSFN subframes corresponding to the frequency other than the frequency indicated by the frequency information included in the MBMS interest information, the eNB 200 assigns the resource blocks included in the MBSFN subframes to the D2D communication. In other words, the D2D resources are assigned from among the MBSFN subframes in the frequency in which the UE 100-1 does not have an interest.

In step S13, the eNB 200 transmits, to the UE 100-1, the D2D resource information indicating the D2D resource determined in step S12. Upon receiving the D2D resource information, the UE 100-1 performs the D2D communication by using the D2D resource indicated by the D2D resource information.

Thus, by using, in the D2D communication, those MBSFN subframes that are in a frequency in which the UE 100-1 does not have an interest, the coexistence of the D2D communication and the cellular communication can be achieved, which enables the radio resource to be used effectively. Furthermore, the UE 100-1 can receive the MBMS data delivered in the frequency in which the UE 100-1 has an interest, while performing the D2D communication.

Fifth Embodiment

Hereinafter, the fifth embodiment will be described while focusing on the differences from the fourth embodiment.

In the above-described fourth embodiment, the eNB 200 controls whether or not to assign at least a part of the MBSFN subframes to the D2D communication on the basis of the frequency information included in the MBMS interest information.

In contrast, in the present embodiment, the eNB 200 that performs radio resource assignment for the D2D communication controls whether or not to assign at least a part of the MBSFN subframes to the D2D communication on the basis of the MBMS counting information (MBMS counting response) notified from the UE 100 accommodated by the eNB 200.

The MBMS counting information is one of the RRC messages, and is used for counting the number of UEs 100 that receive the MBMS data. Specifically, the eNB 200 transmits an MBMS counting request to the UE 100 within the cell of the eNB 200. The UE 100 that receives the MBMS counting request includes the MBMS reception status of the UE 100 in the MBMS counting information and transmits the information to the eNB 200. The MBMS counting information includes the information indicating the MBMS data (MBMS channel) received by the UE 100-1.

Figure 18:
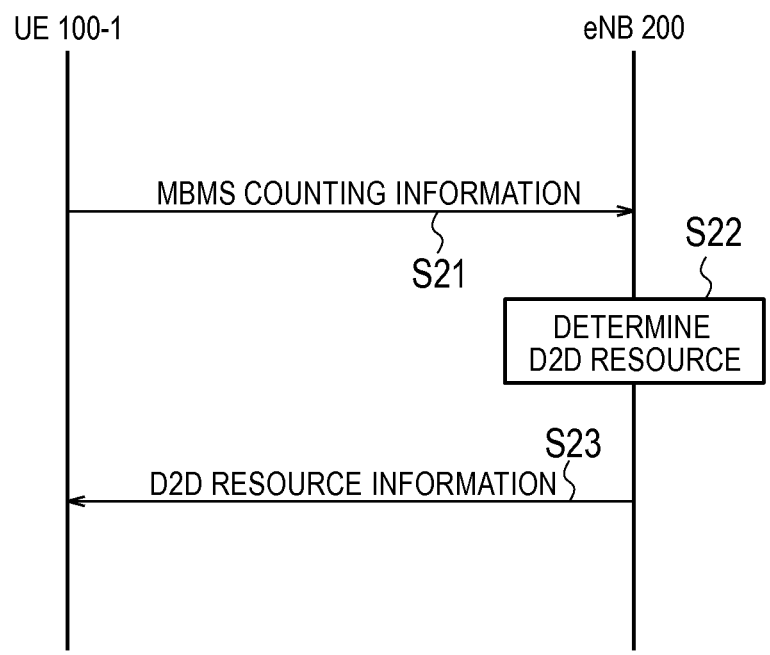
FIG. 18 is an operation sequence diagram according to the fifth embodiment.

FIG. 18 is an operation sequence diagram according to the present embodiment. In the present embodiment, unlike the fourth embodiment, it is not needed that the downlink is operated at a plurality of frequencies (multi-carriers).

As illustrated in FIG. 18, in step S21, the UE 100-1 transmits the MBMS counting information (MBMS counting response) to the eNB 200. The eNB 200 receives the MBMS counting information from the UE 100-1.

In step S22, the eNB 200 determines a D2D resource to be assigned to the D2D communication by the UE 100-1 and the UE 100-2. On the basis of the MBMS interest information received in step S22, the eNB 200 controls whether or not to assign at least a part of the MBSFN subframes to the D2D communication.

In the present embodiment, on the basis of the information indicating the MBMS data (MBMS channel) included in the MBMS counting information and received by the UE 100-1, the eNB 200 controls whether or not assign at least a part of the MBSFN subframes to the D2D communication. Firstly, based on the MBMS counting information, the eNB 200 determines the MBMS data (MBMS channel) of which the distribution is to be stopped. Specifically, the eNB 200 stops the distribution of the MBMS data (MBMS channel) that is not received in each UE 100 accommodated in the cell of the eNB 200. Secondly, when there occurs a surplus of radio resources of the MBMS data (MBMS channel) of which the distribution is stopped due to stopping of distribution of the MBMS data (MBMS channel), the eNB 200 releases a part of the radio resources for the D2D communication.

Figure 19:
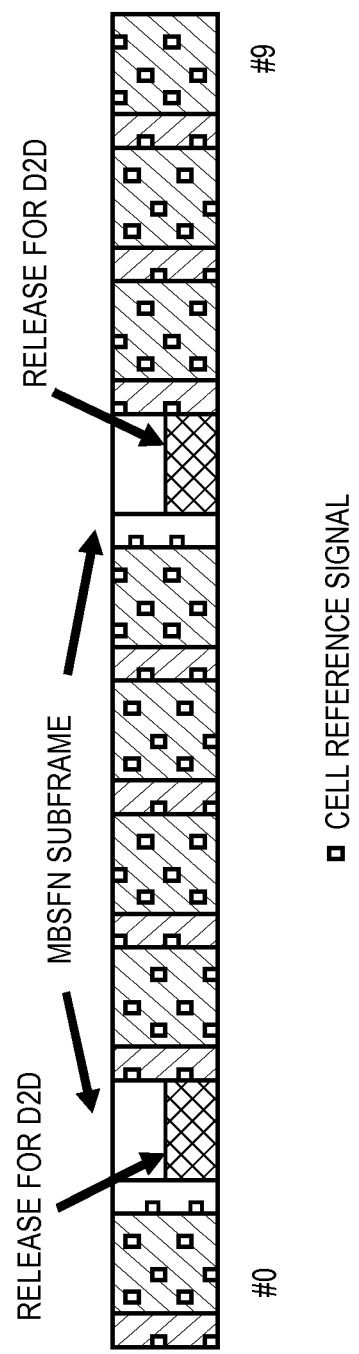
FIG. 19 is a diagram illustrating an example of a D2D resource assignment according to the fifth embodiment.

FIG. 19 is a diagram illustrating an example of a D2D resource assignment according to the present embodiment. As illustrated in FIG. 19, when there occurs a surplus of radio resources for the MBMS data (MBMS channel) of which the distribution is stopped due to stopping of distribution of the MBMS data (MBMS channel) on the basis of the MBMS counting information, the eNB 200 releases a part of the radio resources for the D2D communication. In the example illustrated in FIG. 19, by releasing a part of the MBSFN subframes for the D2D communication, the MBMS distribution and the D2D communication coexist within the MBSFN subframe.

Returning to FIG. 18, in step S23, the eNB 200 transmits, to the UE 100-1, the D2D resource information indicating the D2D resource determined in step S22. Upon receiving the D2D resource information, the UE 100-1 performs the D2D communication by using the D2D resource indicated by the D2D resource information.

Therefore, according to the present embodiment, by using the radio resources for the MBMS data (MBMS channel) of which the distribution is stopped, in the D2D communication, the radio resources can be used effectively.

Sixth Embodiment

Hereinafter, the sixth embodiment will be described while focusing on the differences from the first and the fifth embodiments.

In the above-described fourth embodiment and the fifth embodiment, the specific function is the MBMS function, and the specific subframes are the MBSFN subframes.

In contrast, in the sixth embodiment, the specific function is the ICIC function, and the specific subframes are the ABSs.

The ICIC function is designed so that a plurality of cells (a plurality of eNBs) work together to avoid the interference among cells. Particularly, the ICIC function is important under a communication environment in which a small eNB, such as a pico eNB (PeNB) is set up in the cell of a macro eNB (MeNB).

Figure 20:
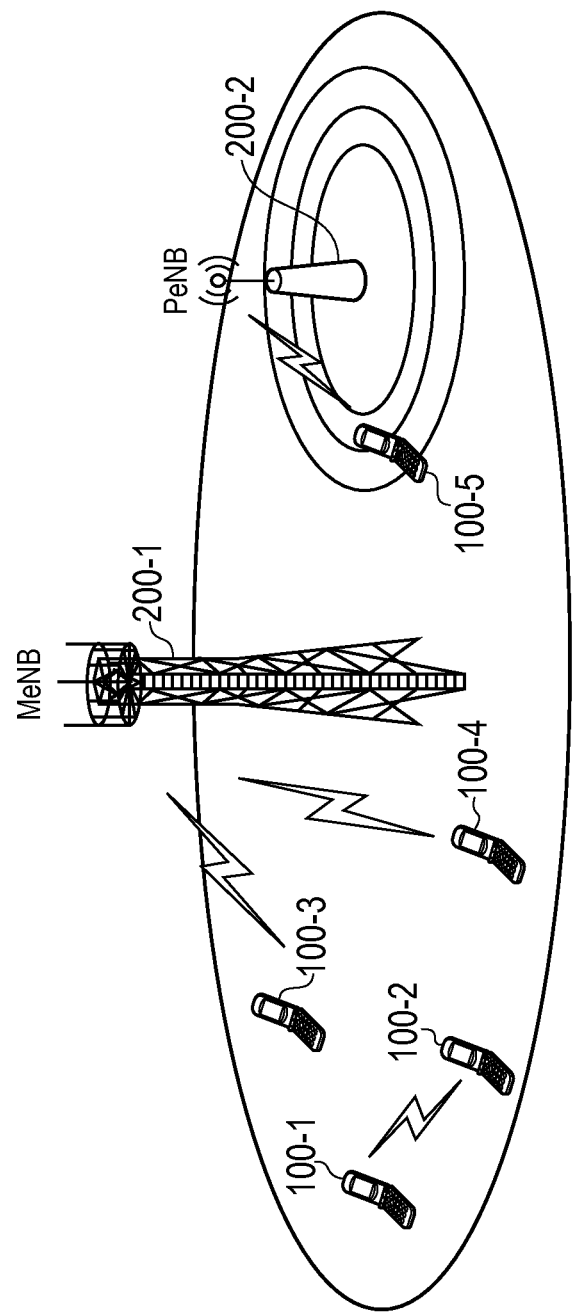
FIG. 20 is a diagram for illustrating a communication environment according to the sixth embodiment.

FIG. 20 is a diagram for illustrating a communication environment according to the present embodiment.

As illustrated in FIG. 20, PeNB 200-2 is set up in the cell of MeNB 200-1. Furthermore, the UE 100-1 through UE 100-4 are accommodated in the MeNB 200-1. UE 100-5 is accommodated in the PeNB 200-2.

The UE 100-1 and the UE 100-2 perform the D2D communication by using a D2D resource that is assigned from the MeNB 200-1. The UE 100-3 and the UE 100-4 perform the cellular communication with the MeNB 200-1 by using the radio resource assigned from the MeNB 200-1. The UE 100-5 performs the cellular communication with the PeNB 200-2 by using a radio resource that is assigned from the PeNB 200-2.

In such a communication environment, the downlink of the PeNB 200-2 receives a large interference from the downlink of the MeNB 200. Therefore, the MeNB 200-1 sets a part of the downlink subframes as the ABS. The ABS is a subframe that is rendered approximately blank (Almost Blank) to avoid the interference among cells.

Figure 21:
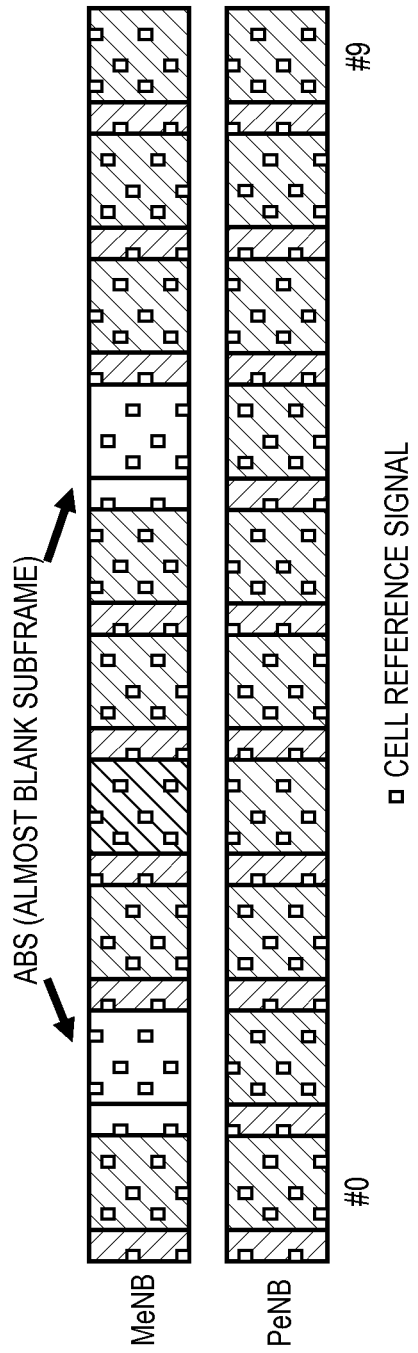
FIG. 21 is a diagram for illustrating ABS according to the sixth embodiment.

FIG. 21 is a diagram for illustrating ABS. As illustrated in FIG. 21, in a downlink radio frame, for example, the MeNB 200-1 sets the subframes having the subframe numbers #1 and #6 as the ABS.

The MeNB 200-1 notifies the set ABS to the PeNB 200-2. In the subframes corresponding to the ABS of the MeNB 200-1, the downlink of the PeNB 200-2 can avoid the interference from the downlink of the MeNB 200, and therefore, the downlink communication can be performed satisfactorily. However, from the viewpoint of the MeNB 200-1, the ABS becomes useless radio resources that cannot be used in the downlink communication.

Thus, in the present embodiment, the MeNB 200-1 that performs radio resource assignment for the D2D communication assigns at least a part of the ABSs in the D2D communication, if the ABSs are set.

FIG. 22 is a diagram for illustrating an operation of the MeNB 200-1 according to the present embodiment.

As illustrated in FIG. 22, when the ABSs are set, the MeNB 200-1 assigns the resource blocks included in the ABSs as the D2D resources.

The UE 100-1 and the UE 100-2 perform the D2D communication by using a D2D resource that is assigned from the MeNB 200-1. It must be noted that because the transmission power in the D2D communication has a low value, the effect of the interference that the downlink of the PeNB 200-2 receives from the D2D communication is less.

On the other hand, as regard the subframes other than the ABS, the MeNB 200-1 assigns a radio resource to the UE 100-3 and the UE 100-4, as usual.

Thus, by using the ABS in the D2D communication, the coexistence of the D2D communication and the cellular communication can be achieved, which enables the radio resources to be used effectively.

[Modification]

For example, the aforementioned fourth embodiment and fifth embodiment may be implemented separately and independently, and in addition, may be combined and implemented.

Other Embodiments

Modification of First Embodiment

In the first embodiment described above, a specific radio resource used for transmission of a predetermined uplink signal in a cellular communication, the use of D2D communication has been regulated for all UEs 100. However, rather than to regulate the use of D2D communication for all UE 100, it is possible to regulate the use of the D2D communication only for some UEs 100 that satisfies a predetermined condition.

For example, an effect of interference provided by UE 100 having small path loss with eNB 200 to cellular uplink communication is large. On the other hand, an effect of interference provided by UE 100 having large path loss with eNB 200 to cellular uplink communication is small. This is because D2D communication signal transmitted by UE 100 having small path loss with eNB 200 is received at eNB 200 with high power. Therefore, it is possible to allow the specific radio resources to use for D2D communication, for UE 100 having path greater than or equal to threshold with eNB 200. In contrast, the UE 100 having path loss smaller than the threshold with the eNB 200, a use of specific radio resource to D2D communication is prohibited.

The prohibited UE 100 may refrain the use of specific radio resources or may be instructed to prohibit the use of specific radio resources from eNB 200.

As method of estimating path loss, if the UE 100 estimates, it may be estimated from the received power of the reference signal transmitted from eNB 200. Further, when eNB 200 estimates, it may be estimated from the received power of the cellular reference signal transmitted form UE 100 or received power of D2D reference signal (including the Discovery signal or synchronizing signal) transmitted form UE 100.

Modification of the Second and Third Embodiments

In the second and third embodiments described above, the specific radio resource used for transmission of the predetermined downlink signal in a cellular communication, the use of D2D communication has been restricted for all UEs 100. However, rather than to regulate the use of D2D communication for all UEs 100, it is possible to regulate the use of the D2D communication only for UE 100 that satisfies a predetermined condition.

For example, an effect of interference provided by UE 100 having large path loss with eNB 200 to cellular downlink communication is large. On the other hand, an effect of interference provided by UE 100 having small path loss with eNB 200 to cellular downlink communication is small. This is because a cellular communication quality of the downlink is easily deteriorated in positions where path loss with eNB 200 is large (e.g. cell edge). Thus, the UE 100 having path loss equal to or less than the threshold with eNB 200 can be allowed to be used for D2D communication specified radio resource. In contrast, for the UE 100 having path loss greater than a threshold with the eNB 200, using specified radio resource to D2D communication is prohibited.

The prohibited UE 100 may refrain the use of specific radio resources by determining the predetermined condition or may be instructed to prohibit the use of specific radio resources from eNB 200.

As method of estimating path loss, when the UE 100 estimates, it may be estimated from the received power of the reference signal transmitted from eNB 200. Further, when eNB 200 estimates, it may be estimated from the received power of the cellular reference signal transmitted from UE 100 or D2D reference signal (including the Discovery signal or synchronizing signal) transmitted from UE 100.

Modification of the Fourth Embodiment to the Sixth Embodiment

In the fourth to sixth embodiments described above, a use for D2D communication in a specific subframe to achieve a specific function in cellular communication has been allowed for all UEs 100. However, rather than to allow all UEs 100 to use in D2D communication, the use in D2D communication may be restricted for some UEs that satisfies predetermined condition.

For example, in the case of using the MBSFN subframes for D2D communication, an effect of interference provided by UE 100 having large path loss with eNB 200 to cellular downlink communication (MBMS reception) is large. On the other hand, an effect of interference provided by UE 100 having small path loss with eNB 200 to cellular downlink communication (MBMS reception) is small. This is because a cellular communication quality of the downlink is easily deteriorated in positions where path loss with eNB 200 is large (e.g. cell edge). Thus, the UE 100 having path loss equal to or less than the threshold with eNB 200 can be allowed to be used for D2D communication specified radio resource. In contrast, for the UE 100 having path loss greater than a threshold with the eNB 200, using specified radio resource to D2D communication is prohibited.

The prohibited UE 100 may refrain from the use of MBSFN subframes by determining the predetermined condition or may be instructed to prohibit the use of MBSFN subframes from eNB 200.

As method of estimating path loss, when the UE 100 estimates, it may be estimated from the received power of the reference signal transmitted from eNB 200. Further, when eNB 200 estimates, it may be estimated from the received power of the cellular reference signal transmitted from UE 100 or D2D reference signal (including the Discovery signal or synchronizing signal) transmitted from UE 100.

INDUSTRIAL APPLICABILITY

The present disclosure is useful in mobile communication fields.

The invention claimed is:

1. A user terminal that supports cellular communication and device-to-device (D2D) proximity service, comprising:
a receiver configured to receive information from a base station, the information indicating a D2D resource pool reserved from among uplink radio resources of the cellular communication, wherein the uplink radio resources include physical random access channel (PRACH) resources used for PRACH transmission in the cellular communication;
a controller configured to autonomously select radio resources from among the D2D resource pool, the radio resources used for D2D transmission, wherein the controller selects the radio resources while avoiding selection of the PRACH resources; and
a transmitter configured to transmit D2D signals to other user terminals using the selected radio resources.

2. The user terminal according to claim 1, wherein the uplink radio resources further include demodulation reference signal (DMRS) resources used for DMRS transmission in the cellular communication, and
the controller is configured to select the radio resources while further avoiding selection of the DMRS resources.

3. A method performed at a user terminal that supports cellular communication and device-to-device (D2D) proximity service, comprising:
receiving information from a base station using a receiver, the information indicating a D2D resource pool reserved from among uplink radio resources of the cellular communication, wherein the uplink radio resources include physical random access channel (PRACH) resources used for PRACH transmission in the cellular communication;
autonomously selecting radio resources from among the D2D resource pool using a controller, the radio resources used for D2D transmission, wherein the selecting includes selecting the radio resources while avoiding selection of the PRACH resources; and
transmitting D2D signals to other user terminals using the selected radio resources using a transmitter.

4. The method according to claim 3, wherein
the uplink radio resources further include demodulation reference signal (DMRS) resources used for DMRS transmission in the cellular communication, and
the selecting includes selecting the radio resources while further avoiding selection of the DMRS resources.

5. A device to be equipped in a user terminal that supports cellular communication and device-to-device (D2D) proximity service, comprising:
a processor coupled to a memory, the processor configured to execute processes of:
receiving information from a base station, the information indicating a D2D resource pool reserved from among uplink radio resources of the cellular communication, wherein the uplink radio resources include physical random access channel (PRACH) resources used for PRACH transmission;
autonomously selecting radio resources from among the D2D resource pool, the radio resources used for D2D transmission, wherein the processor is configured to select the radio resources while avoiding selection of the PRACH resources; and
transmitting D2D signals to other user terminals using the selected radio resources, the D2D signals including a D2D discovery signal used to discover a proximity user terminal.

6. The device according to claim 5, wherein
the uplink radio resources further include demodulation reference signal (DMRS) resources used for DMRS transmission in the cellular communication, and
the processor is configured to select the radio resources while further avoiding selection of the DMRS resources.

* * * * *